United States Patent
Kwon et al.

(10) Patent No.: US 10,824,262 B2
(45) Date of Patent: Nov. 3, 2020

(54) TOUCH CONTROL DEVICE, VEHICLE HAVING THE SAME, AND METHOD FOR MANUFACTURING THE TOUCH CONTROL DEVICE

(71) Applicant: HYUNDAI MOTOR COMPANY, Seoul (KR)

(72) Inventors: Gideok Kwon, Seoul (KR); Jong Bok Lee, Suwon-si (KR); Seo Ho Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 173 days.

(21) Appl. No.: 15/355,191

(22) Filed: Nov. 18, 2016

(65) Prior Publication Data

US 2017/0147130 A1    May 25, 2017

(30) Foreign Application Priority Data

Nov. 19, 2015 (KR) ........................ 10-2015-0162742

(51) Int. Cl.

| | |
|---|---|
| *G06F 3/041* | (2006.01) |
| *G06F 3/0488* | (2013.01) |
| *B60K 37/06* | (2006.01) |
| *G06F 3/0354* | (2013.01) |
| *B60K 35/00* | (2006.01) |

(Continued)

(52) U.S. Cl.
CPC ............ *G06F 3/0416* (2013.01); *B60K 35/00* (2013.01); *B60K 37/06* (2013.01); *B60R 16/023* (2013.01); *G06F 3/03547* (2013.01); *G06F 3/044* (2013.01); *G06F 3/0412* (2013.01); *G06F 3/04883* (2013.01); *G06F 3/04886* (2013.01); *B60K 2370/143* (2019.05); *G06F 2203/04103* (2013.01); *G06F 2203/04104* (2013.01)

(58) Field of Classification Search
None
See application file for complete search history.

(56) References Cited

U.S. PATENT DOCUMENTS

2009/0266622 A1* 10/2009 Yoshikawa ............. G06F 3/044
178/18.01
2014/0131075 A1* 5/2014 Jang ....................... G06F 3/041
174/255

(Continued)

FOREIGN PATENT DOCUMENTS

| JP | 2015-049601 A | 3/2015 |
|---|---|---|
| JP | 2015-184882 A | 10/2015 |

(Continued)

OTHER PUBLICATIONS

Office Action issued in corresponding Korean Patent Application No. 10-2015-0162742, dated May 31, 2017.

*Primary Examiner* — Amare Mengistu
*Assistant Examiner* — Sarvesh J Nadkarni
(74) *Attorney, Agent, or Firm* — Morgan, Lewis & Bockius LLP

(57) ABSTRACT

A touch control device includes a base including a metal complex; a sensing pattern formed in a pattern groove formed in a touch area of the base and including a conductive material; and a wire arranged in a wire groove outside of the touch area of the base and connecting the sensing pattern and an integrated circuit, the wire including a conductive material.

14 Claims, 38 Drawing Sheets

(51) Int. Cl.
*B60R 16/023* (2006.01)
*G06F 3/044* (2006.01)

(56) References Cited

U.S. PATENT DOCUMENTS

| | | | |
|---|---|---|---|
| 2014/0251661 A1* | 9/2014 | Cok | G02B 6/138 174/253 |
| 2015/0041299 A1* | 2/2015 | Suzuki | B62D 1/046 200/5 A |
| 2015/0205424 A1* | 7/2015 | Park | G06F 3/0414 345/174 |
| 2017/0147130 A1* | 5/2017 | Kwon | B60R 16/023 |

FOREIGN PATENT DOCUMENTS

| | | |
|---|---|---|
| KR | 10-0681157 B1 | 2/2007 |
| KR | 10-2008-0110477 A | 12/2008 |
| KR | 10-2012-0018059 A | 2/2012 |
| KR | 10-1202552 B1 | 11/2012 |
| KR | 10-2014-0084879 A | 7/2014 |
| KR | 10-2015-0009318 A | 1/2015 |
| KR | 10-2015-0013958 A | 2/2015 |
| KR | 10-2015-0026961 A | 3/2015 |
| KR | 10-2015-0094539 A | 8/2015 |

\* cited by examiner (a)

(b)

TOUCH CONTROL DEVICE, VEHICLE HAVING THE SAME, AND METHOD FOR MANUFACTURING THE TOUCH CONTROL DEVICE

CROSS-REFERENCE TO RELATED APPLICATION

This application claims the benefit of priority to Korean Patent Application No. 10-2015-0162742, filed on Nov. 19, 2015 in the Korean Intellectual Property Office, the entire disclosure of which is incorporated herein by reference.

TECHNICAL FIELD

The present disclosure relates to an input device, a vehicle having the same, and a method for manufacturing the input device, and more particularly, to an input device with electrodes installed by a laser process, a vehicle having the input device, and a method for manufacturing the input device.

BACKGROUND

With advancements in electronics and communication technologies, many different electronic devices are being introduced, and these electronic devices feature improved ease of use as well as improved aesthetic design. Such trends are followed by diversification of input devices that used to be represented by keyboards or keypads.

Input devices are used in various kinds of display systems, such as portable terminals, notebooks, smart phones, smart pads, smart televisions, etc., which provide information to the user. Along with the advanced electronic devices, a method of inputting commands by means of touch is widely used these days in addition to key or dial based input methods.

A touch control device is one of the devices that configure interfaces between an information and communication terminal with many different displays and the user. The touch control device enables the human-terminal interface when the user directly contacts or approaches a touch pad or touch screen using an input tool, such as his/her finger or a touch pen.

Since the touch control device is easy to use for everyone just by contact of the input tool, such as a human finger or a touch pen, it may be used in various devices, such as Automated Teller Machines (ATMs), Personal Digital Assistants (PDAs), mobile phones, etc., and in various areas, such as banks, government offices, tourist offices, and traffic guide systems, etc.

Recently, efforts have been made to incorporate touch control devices into health and medical products and vehicles. In this regard, since the touch panel in particular can be used with the touch screen or used standalone, its usage has increased. Furthermore, in addition to a function of dragging a point by touch, a function to input gestures is being developed. For the touch control device capable of inputting gestures, efforts to increase recognition rate of gestures are continuing.

To implement a touch control device capable of being manipulated by touch, resistive, capacitive, surface acoustic wave, transmitter methods, etc., may be used. A touch control device using the capacitive method includes a type that forms crossing electrode patterns and detects an input position by sensing a change in capacitance between the electrodes when an input means, such as a finger comes into contact with the touch control device. Another type using the capacitive method applies the same electric potential of a phase to both terminals of a transparent conductive film and detects an input position by sensing a small current that flows when a capacitance is formed by an input means, such as a finger coming into contact with or approaching the touch control device.

In general, the touch control device has a 2-panel layered structure in which a first panel including a number of first metal patterns that electrically connect first sensing patterns arranged in the first direction, e.g., in the x-axis direction, to a sensor circuit for calculating positions of the first sensing patterns on a first substrate, and a second panel including a number of second metal patterns that electrically connect second sensing patterns arranged in the second direction, e.g., in the y-axis direction, to a sensor circuit for calculating the positions of the second sensing patterns are stuck together by an adhesive.

As a method for manufacturing the touch control device, a method to use Indium Tin Oxide (ITO), which is the transparent electrode, a method to use metal mesh, a method to use a Flexible Printed Circuit Board (FPCB), or the like, to be applied to the touch panel may be used.

Conventional connections between touch integrated circuits (ICs) and the sensor electrode parts where the sensing patterns are formed are usually manufactured of FPCB electrode materials. The FPCB is processed to fit the shape and bends of an injection molded product, and then attached to the surface of the injection molded product. In this case, however, the adhesion of the FPCB may fall off due to heat or vibration.

In addition, the FPCB is quite expensive, and sometimes much of the FPCB is wasted because of the shape of the touch area, leading to an economic loss. Furthermore, if a sensing pattern is attached to a curved FPCB, the adhesion of the sensing pattern may fall off due to heat or vibration.

Beside the FPCB-based process, other existing processes also use adhesion methods, which make the product vulnerable to external vibration, shocks, or high heat. Accordingly, these processes decrease product durability, and are also difficult to apply to devices exposed to vibration and high temperature.

SUMMARY

The present disclosure provides a touch control device and method for manufacturing the touch control device, by which electrodes of the touch control device may be formed without using adhesion methods.

The present disclosure also provides a touch control device and method for manufacturing the touch control device, by which a waste of an expensive FPCB in installing wires is prevented and a base on which sensing electrodes and wires are arranged is integrally formed.

In accordance with one aspect of the present disclosure, a touch control device comprises a base including a metal complex; a sensing pattern formed in a pattern groove formed in a touch area of the base and including a conductive material; and a wire arranged in a wire groove formed outside of the touch area of the base and connecting the sensing pattern and an integrated circuit, the wire including a conductive material.

Also, the pattern groove and the wire groove may be connected to each other.

Also, the sensing pattern and the wire may be formed integrally.

Also, the base may comprise resin selected from one or more of Polycarbonate (PC), Polyamide (PA), and acrylonitrile-butadiene-styrene copolymer (ABS), and metal oxide selected from one or more of Mg, Cr, Cu, Ba, Fe, Ti, and Al.

Also, the base may be formed by being coated on resin, glass, or leather.

Also, the base may comprise a first base and a second base laminated in a touch area of the first base, and wherein the pattern groove and the sensing pattern comprise a first pattern groove and first sensing pattern formed on one side of the first base, and a second pattern groove and second sensing pattern formed on one side of the second base.

Also, the wire may comprise a first wire formed on one side of the first base and connected to the first sensing pattern, and a second wire formed on one side of the first base and connected to the second sensing pattern.

In accordance with other aspect of the present disclosure, a method for manufacturing a touch control device comprises steps of: preparing a base including a metal complex; forming a pattern groove by irradiating a laser on a touch area of the base; forming a wire groove by irradiating the laser out of the touch area of the base; forming a sensing pattern including a conductive material by a plating or deposition process in the pattern groove; forming a wire including a conductive material by a plating or deposition process in the wire groove; and mounting an integrated circuit in an area outside the touch area to electrically connect to the wire.

Also, the step of irradiating the laser on one side of the base may comprise having metal seeds exposed in the pattern groove and the wire groove, and wherein the plating or deposition process of the sensing pattern and the wire comprises having the conductive material stuck to the metal seeds.

Also, the pattern groove and the wire groove may be formed in the same process.

Also, the step of forming the pattern groove may comprise forming a first pattern groove and a second pattern groove arranged to be separated from the first pattern groove, and wherein forming the sensing pattern comprises forming a first sensing pattern plated or deposited in the first pattern groove and a second sensing pattern plated or deposited in the second pattern groove, further comprising: applying current to the first and second sensing patterns, examining a change in mutual capacitance between the two sensing patterns, and determining whether the patterns fit for sensors based on the examination result.

Also, the method for manufacturing the touch control device may further comprise a step of coating the base on one of resin, glass, and leather.

In accordance with other aspect of the present disclosure, a method for manufacturing a touch control device comprises steps of: preparing a first base including a metal complex; forming a first pattern groove by irradiating a laser on a touch area of the first base; forming a wire groove by irradiating the laser outside of the touch area of the first base; forming a first sensing pattern including a conductive material by a plating or deposition process in the first pattern groove; forming a wire including a conductive material by a plating or deposition process in the wire groove; laminating a second base including a metal complex on the touch area of the first base; forming a second pattern groove by irradiating laser on the second base; forming a second sensing pattern including a conductive material by a plating or deposition process in the second pattern groove; and mounting an integrated circuit in an area outside the touch area to electrically connect to the wire.

Also, the step of forming the wire groove may comprise forming a first wire groove extending from the first pattern groove, and a second wire groove arranged to be separated from the first wire groove.

In accordance with other aspect of the present disclosure, a vehicle includes the touch control device.

Also, the touch control device may be installed in a centralized control system installed in a gearbox.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

representing the FPCB attached to the injection material, and (b) representing unused but discarded FPCB area.

Figure 24:
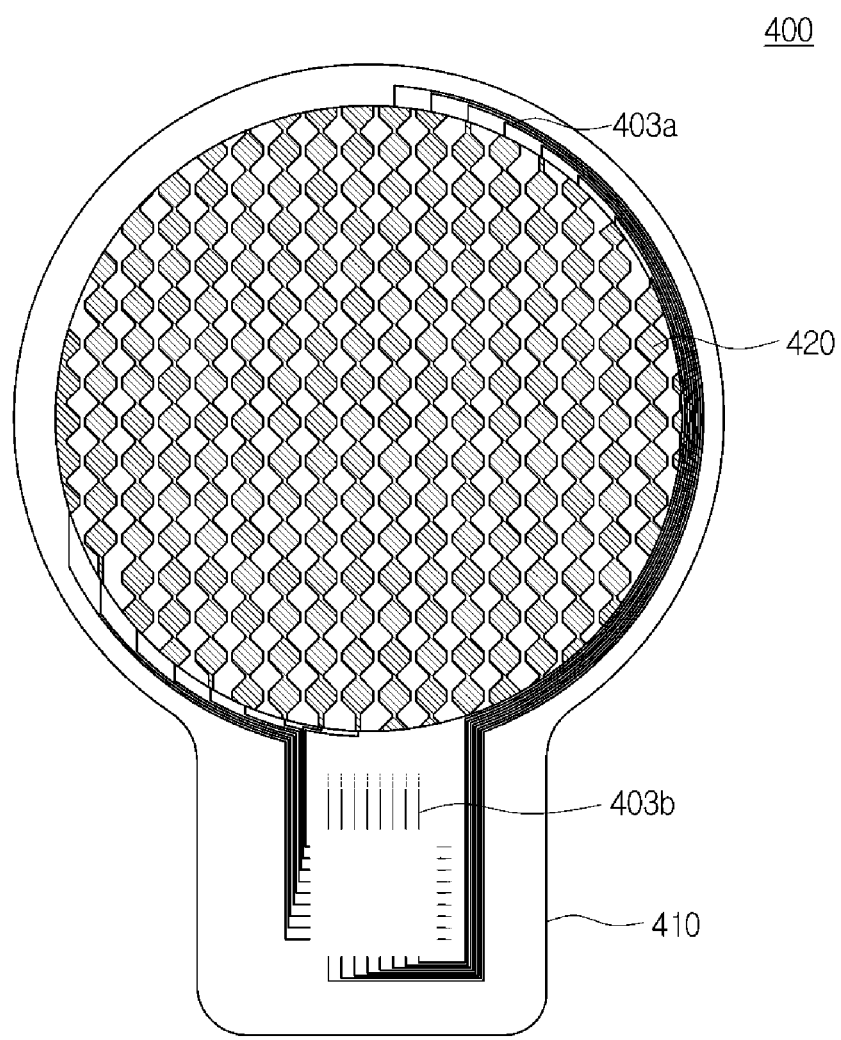

FIG. 24 is a plan view illustrating the first sensing patterns formed on the base.

Figure 25:
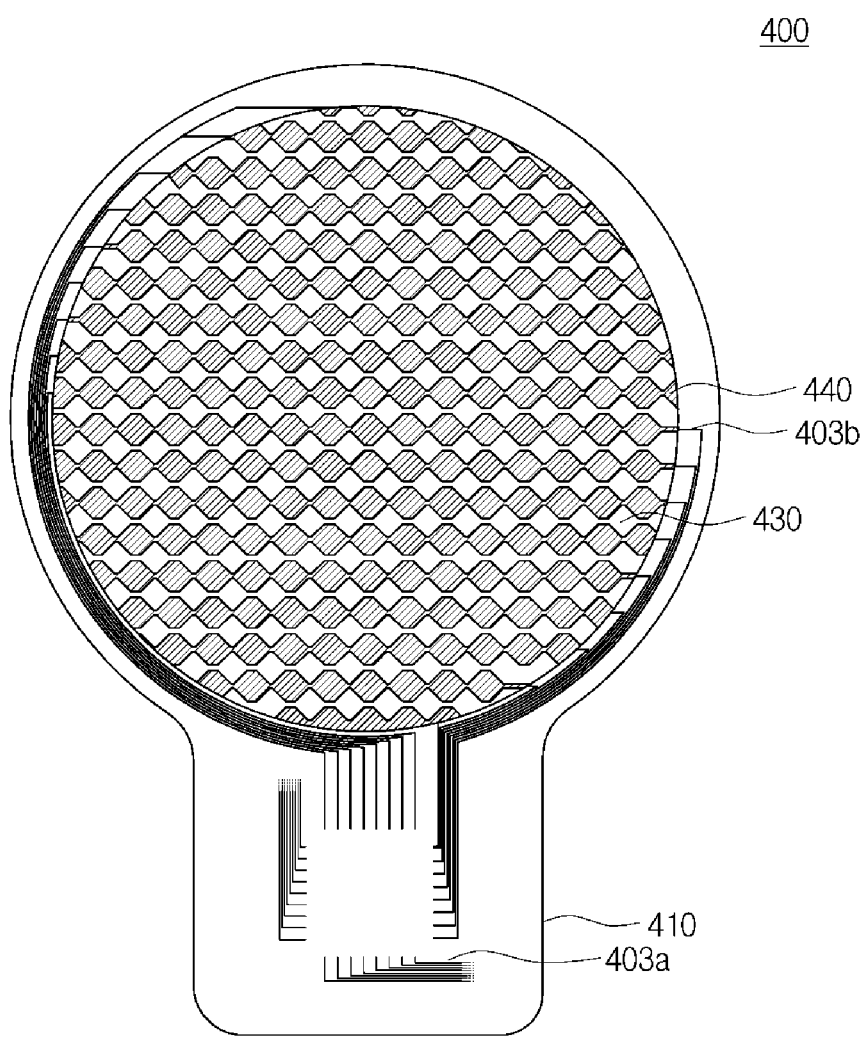

FIG. 25 is a plan view illustrating the second sensing patterns formed on the base.

Figure 26:
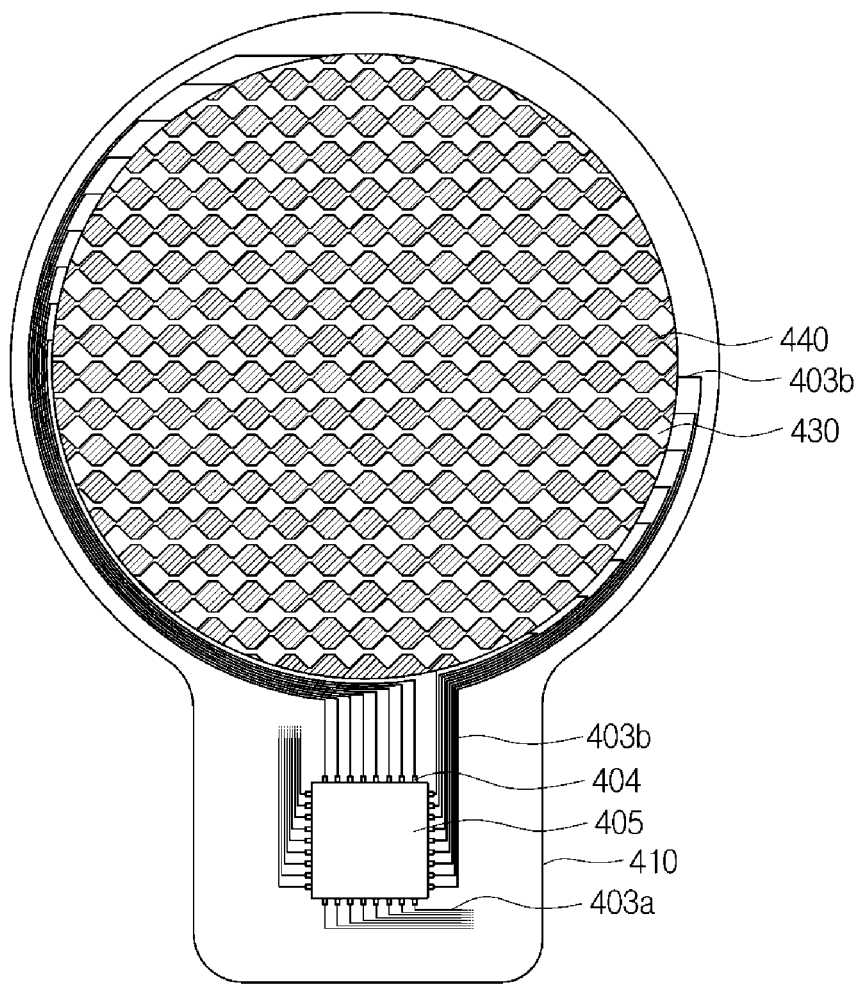

FIG. 26 is a plan view illustrating the integrated circuit mounted on the base.

Figure 27:
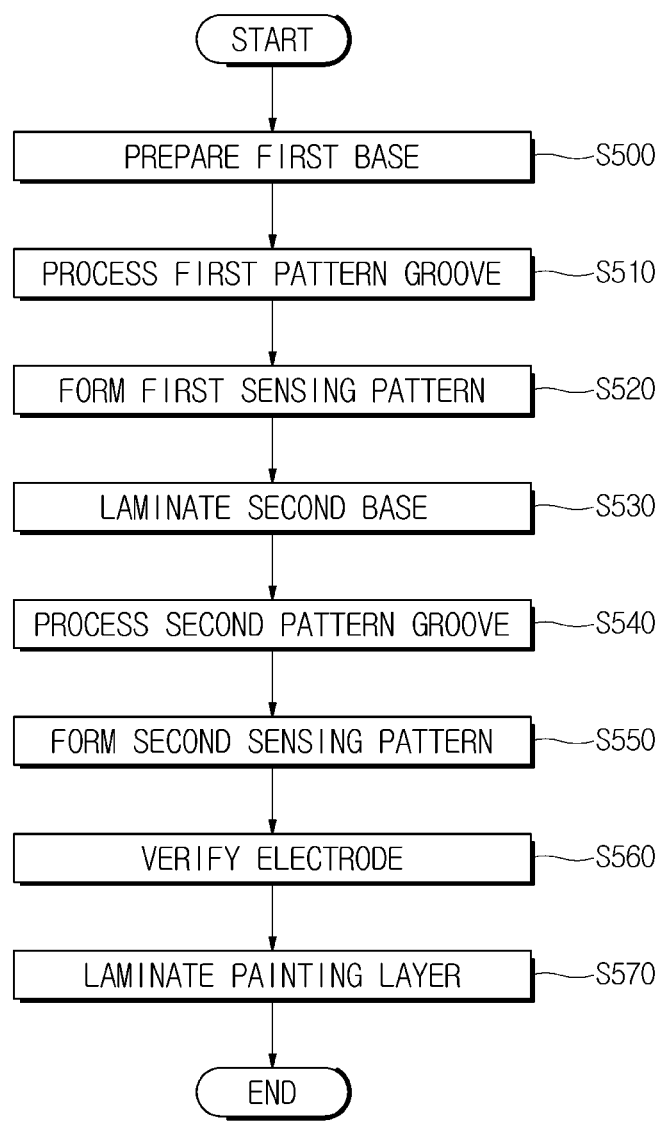

FIG. 27 is a flowchart illustrating a method for manufacturing the touch control device, according to the second embodiment in the present disclosure.

FIGS. 28 to 34 illustrate a method for manufacturing the touch control device, according to the second embodiment in the present disclosure.

Figure 35:
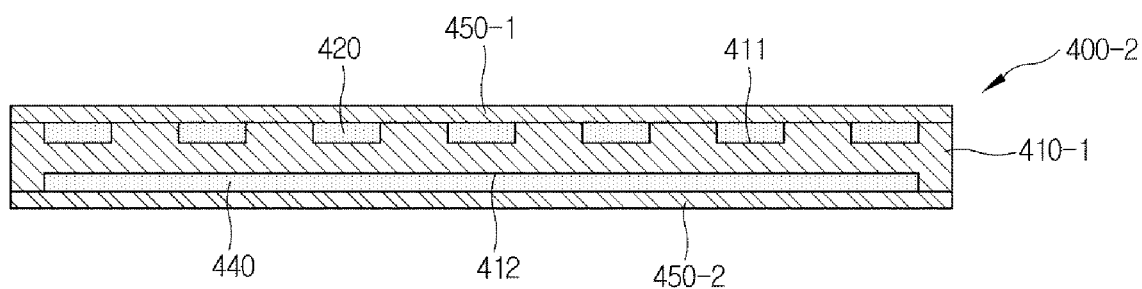

FIG. 35 is a cross-sectional view of a touch control device, according to a third embodiment in the present disclosure.

Figure 36:
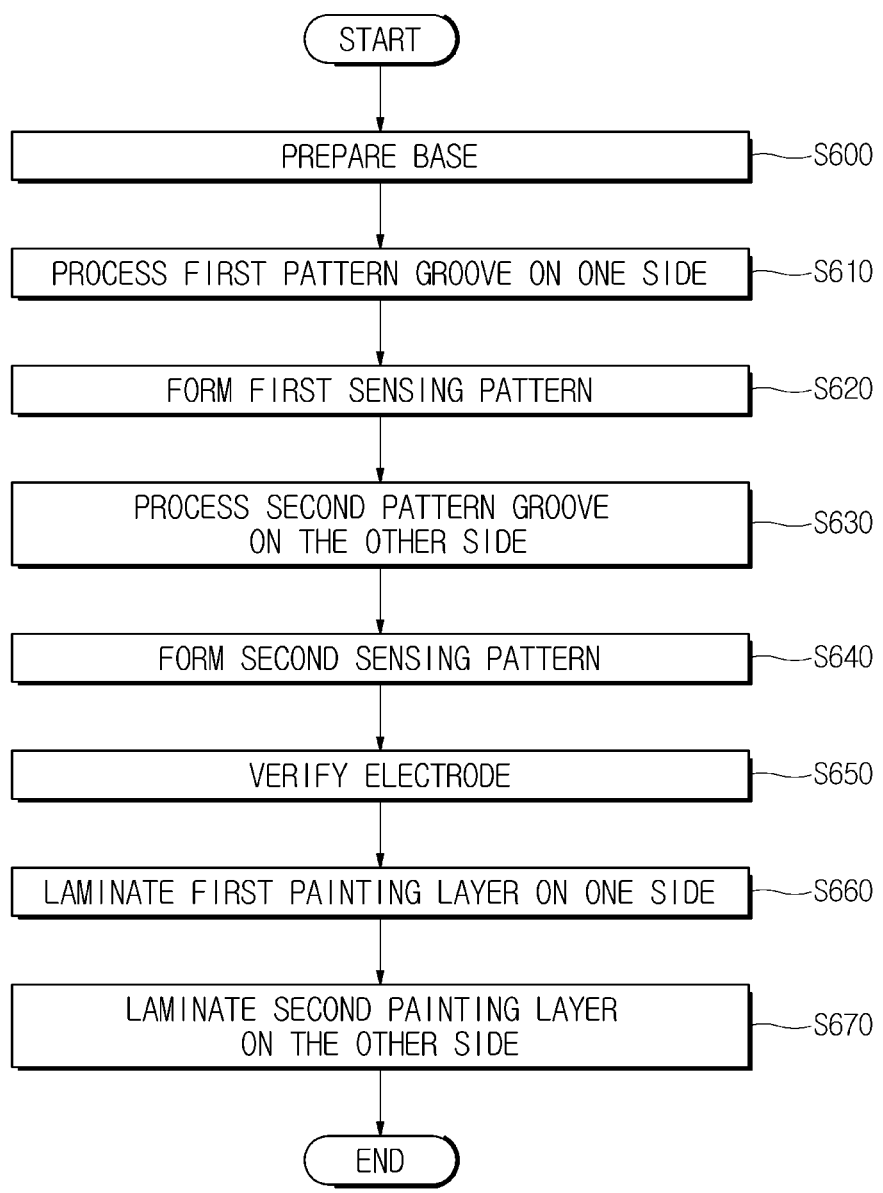

FIG. 36 is a flowchart illustrating a method for manufacturing the touch control device, according to the third embodiment in the present disclosure.

Figure 37:
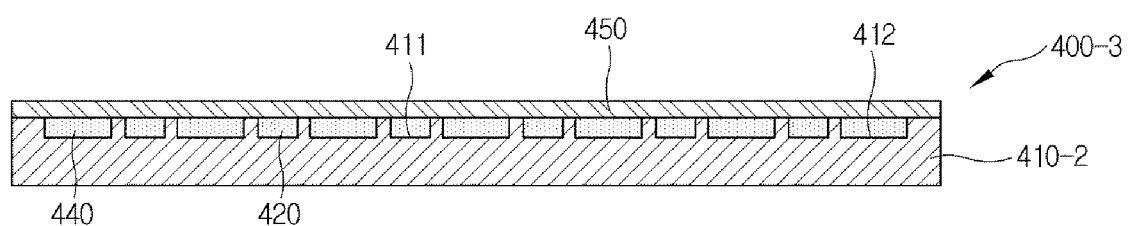

FIG. 37 is a cross-sectional view of a touch control device, according to a fourth embodiment in the present disclosure.

Figure 38:
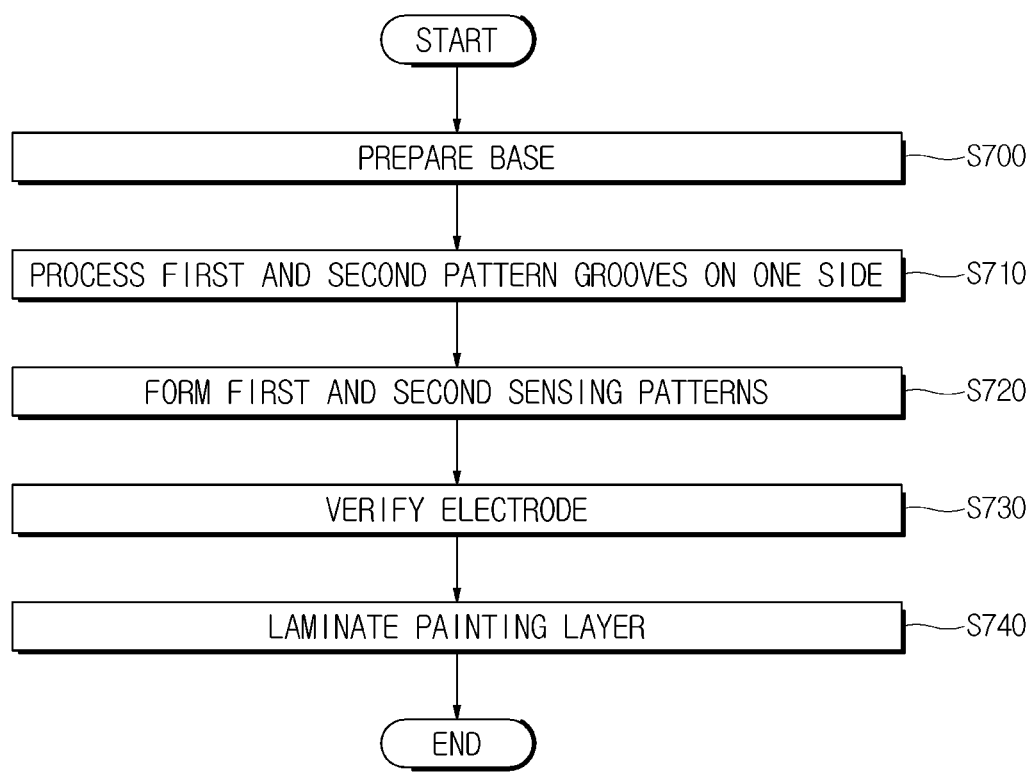

FIG. 38 is a flowchart illustrating a method for manufacturing the touch control device, according to the fourth embodiment in the present disclosure.

DETAILED DESCRIPTION OF EXEMPLARY EMBODIMENTS

Exemplary embodiments in the present disclosure will now be described with reference to accompanying drawings. The following description is provided to assist in a comprehensive understanding of the exemplary embodiments in the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, in the drawings, well-known or unrelated components may be omitted for clarity and conciseness, and some components may be exaggerated in terms of their dimensions or the like for better understanding.

Figure 1:
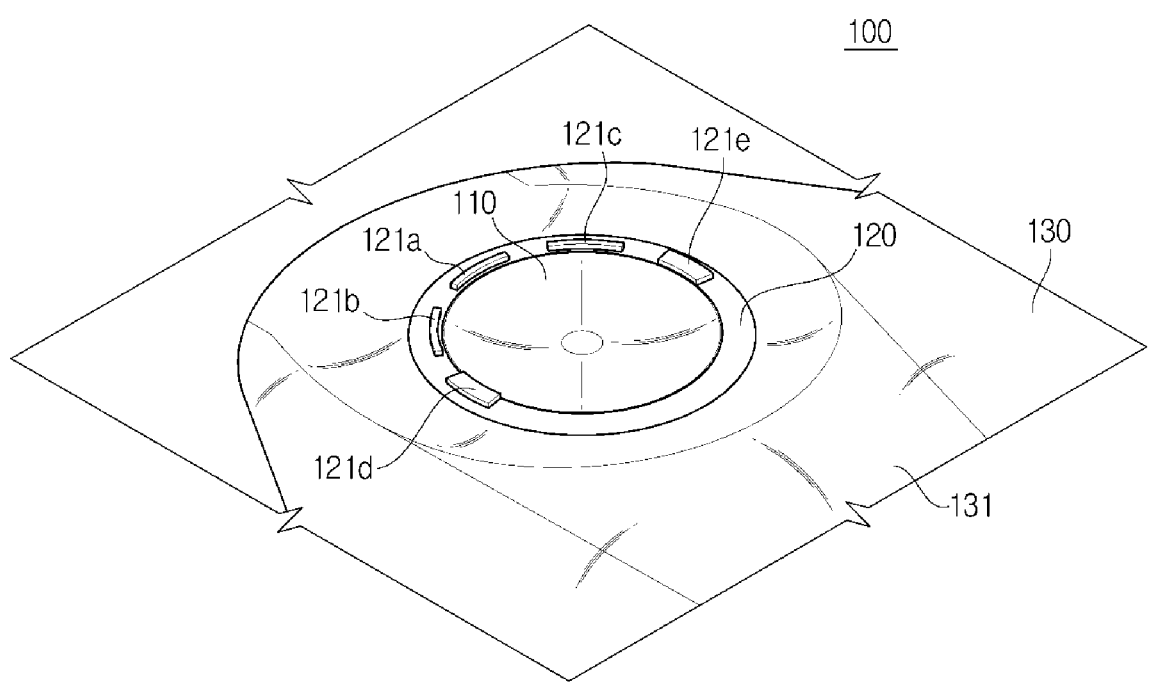
FIG. 1 is a perspective view of a touch control device, according to a first embodiment in the present disclosure.

FIG. 1 is a perspective view of a touch control device 100, according to a first exemplary embodiment in the present disclosure.

The touch control device 100 may include a touch device 110 installed on a mounting face 130.

The touch device 110 may be formed in a certain area capable of receiving a touch signal of the user. For example, as shown in FIG. 1, the touch device 110 may be in a flat round form. It is not limited thereto, but may be in various flat forms including an ellipse.

The touch device 110 may be a touch pad to which a signal is input when the user contacts it with a pointer, such as his/her finger or a touch pen. The user may input a desired instruction or command by inputting a predetermined touch gesture to the touch device 110.

Despite the name, the touch pad may include a touch film or touch sheet with a touch sensor. The touch pad may also include a touch panel, a display device with a touchable screen.

Recognizing the pointer's position while the pointer is not contacting but approaching the touch pad is called 'proximity touch', and recognizing the pointer's position when the pointer contacts the touch pad is called 'contact touch'. Proximity touch is made by recognizing a position on the touch pad vertically corresponding to a position in the air where the pointer approaches the touch pad.

The touch pad may use resistive methods, optical methods, capacitive methods, ultrasonic methods, or pressure methods. That is, various types of touch pads may be used, the types being known to the public.

The touch device 110 may be installed on the inner side of a border part 120. The border part 120 may refer to a part that encloses around the touch device 110, and may be formed of a separate member from that of the touch device 110. Furthermore, the border part 120 may be integrally formed with the mounting face 130, or may be an extra member arranged between the mounting face 130 and the touch device 110. Moreover, it is also possible to omit the border part 120, in which case the touch device 110 may be installed on the inner side of the mounting face 130.

There may be key buttons or touch buttons 121 arranged on the border part 120 to surround the touch device 110. The user may input a gesture to the touch device 110, or may input a signal using the buttons 121 arranged on the border part 120 around the touch device 110.

The touch control device 100 in accordance with the present exemplary embodiment may further include a wrist supporter 131 located proximal to the touch device 110 for supporting a wrist of the user. In this regard, the supporting area of the wrist supporter 131 may be located higher than the touch area of the touch device 110. This is because when the user is making a gesture on the touch device 110 with his/her finger while putting his/her wrist on the wrist supporter 131, having the wrist bent upward may be prevented. Accordingly, it may prevent possible musculoskeletal diseases that might occur from frequent touch gestures, and may provide a more comfortable feeling for the user.

For example, as shown in the drawings, the wrist supporter 131 may be formed integrally with the mounting face 130 but may protrude from the mounting face 130. Alternatively, the wrist supporter 131 may be a separate member arranged on the mounting face 130.

Figure 2:
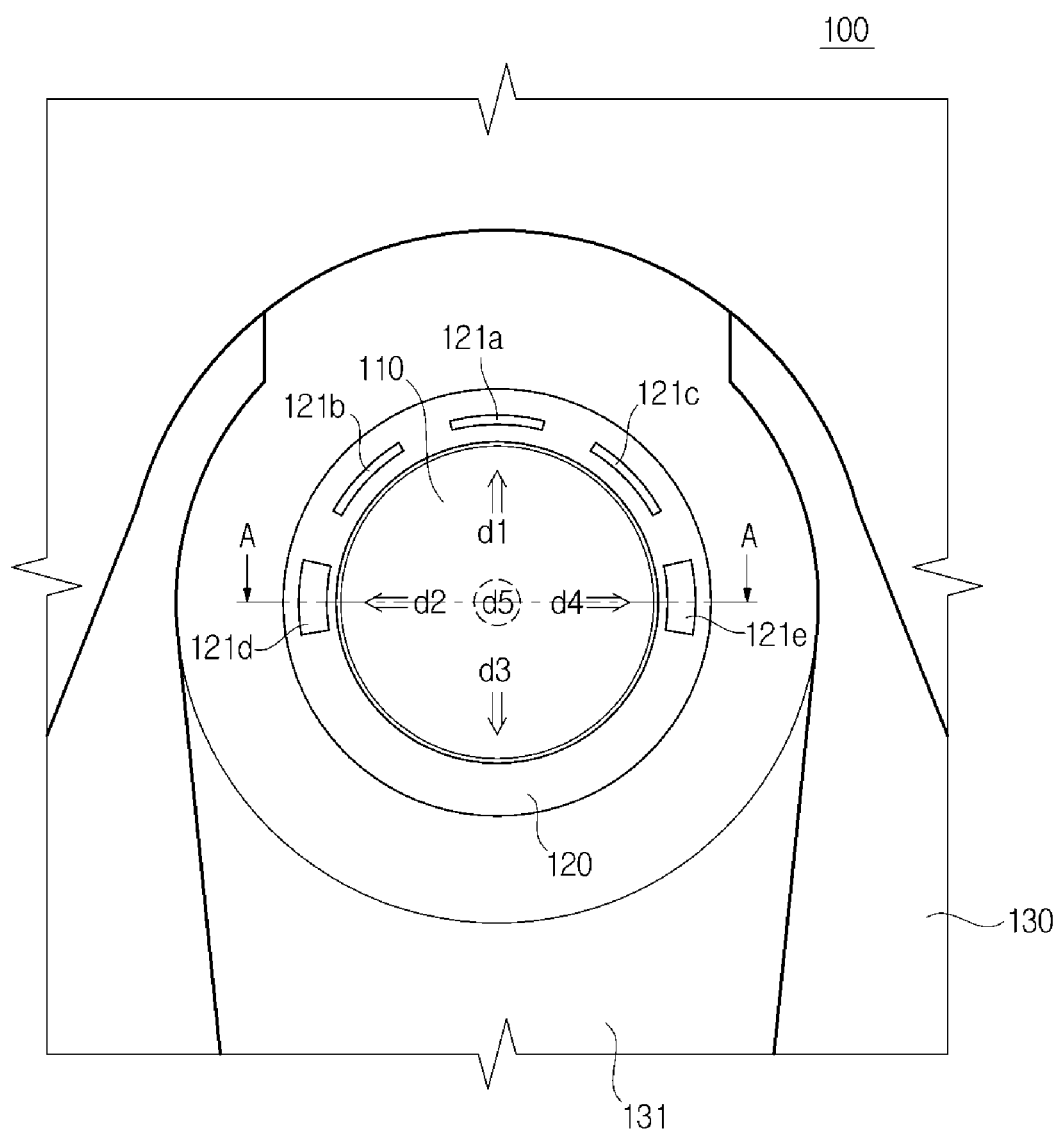
FIG. 2 is a plan view of the touch control device, according to the first embodiment in the present disclosure, for explaining manipulation of the touch control device.

FIG. 2 is a plan view of the touch control device 100, according to the first embodiment of the present disclosure, for explaining manipulation of the touch control device 100.

The touch control device 100 may include a controller for recognizing a signal of a gesture input to the touch device 110, analyzing the gesture signal and giving commands to various devices.

The controller may move the cursor or menu on a display (not shown) according to a movement of the pointer on the touch device 110. For example, if the pointer moves from up to down, the controller may move the cursor appearing on the display to the same direction or may move a preliminarily selected menu from an upper-level menu to a sub-menu.

The controller may also analyze and correspond a track moved by the pointer to a predefined gesture, and execute a command defined for the gesture. The gesture may be input by flicking, rolling, spinning, or tapping of the pointer. In addition, the user may input gestures using various touch input methods.

The term 'flicking' refers to a touch input method in which a contact state is released after the pointer is moved in one direction while being in contact with the touch device 110; 'rolling' refers to a touch input method that draws an arc centered on the center of the touch device 110; 'spinning' refers to a touch input method that draws a circle centered on the center of the touch device 110; 'tapping' refers to a touch input method that taps the touch device 110.

Furthermore, the user may input gestures using a multi-pointer input method. The multi-pointer input method refers to a method of inputting gestures while keeping two pointers in contact at the same time or one after the other. For example, the user may input a gesture while keeping his/her two fingers in contact with the touch device 110. Using the multi-pointer input method, commands or instructions that the user may input may be provided in various ways.

The various touch input methods include not only inputting gestures of numbers, letters, or symbols but also inputting predefined arbitrary gestures. For example, the user may input a command by drawing a Korean consonant/vowel, alphabet, Arabic number, or arithmetic symbol intact on the touch device 110. Instead of selecting letters or numbers on the display, the user may draw them directly on the touch device 110, thereby reducing input time and providing a more intuitive interface.

The touch device 110 may be configured to recognize pressing operation or tilting operation. The user may press a part of the touch device 110 by applying force or tilt it to input a corresponding signal for execution. The pressing operation includes the touch device 110 being pressed both evenly and askew. If the touch device 110 is made flexible, only a part of the touch device 110 may also be pressed.

For example, the touch device 110 may be tilted to at least one direction d1 to d4 from a direction vertical to the touch surface. For example, as shown in FIG. 2, it may be tilted in the front, left, back or right directions d1 to d4. In some embodiments, there may be more diversified directions in which the touch device 110 is tilted. When a center area d5 of the touch device 110 is pressed, the touch device 110 may be pressed evenly.

The user may input a certain instruction or command by pressing or tilting the touch control device 100. For example, the user may select a menu by pressing the center area d5 of the touch device 110, and may move the cursor up by pressing the top area d1 of the touch device 110.

The touch control device 100 may further include a button input 121. The button input 121 may be located around the touch device 110, e.g., on the border part 120. The user may be able to input a gesture while manipulating the button 121 without moving the position of his/her hand, thereby giving a quick operation command.

The button input 121 may include a touch button and a mechanical button. For the touch button, a signal is input just by a touch of the pointer, and for the mechanical button, a signal is input by deformation of the mechanical button from a physical force. The mechanical button may include, for example, a button configured to be clicked, and a button configured to be tilted.

There are 5 buttons 121: 121a, 121b, 121c, 121d, and 121e shown in the drawings. For example, the buttons 121 may include a home button 121a to go to a home menu, a back button 121d to move the current screen to a previous screen, an option button 121e to go to an option menu, and two shortcut buttons 121b, 121c. The shortcut buttons 121b, 121c are to designate and move directly to a menu or device that the user uses frequently.

Although not shown, the touch control device 100 may have various embedded parts related to the operation. The touch control device 100 may have an internal structure enabling the touch device 110 to be pressed or tilted in the aforementioned five directions d1 to d5. Although the structure is not shown in the drawings, it may be obvious to ordinary people in the art to implement the structure.

The touch control device 100 may also have various semiconductor chips and printed circuit boards (PCBs) installed therein. The semiconductor chips may be mounted on the PCB. The semiconductor chip may process information or store data. The semiconductor chip may analyze certain electric signals generated by external force applied to the touch control device 100, a gesture recognized by the touch device 110, or manipulation of the button 121 arranged on the touch control device 100, generate a control signal according to the result of analysis, and send the control signal to a controller or display of another device.

Figure 3:
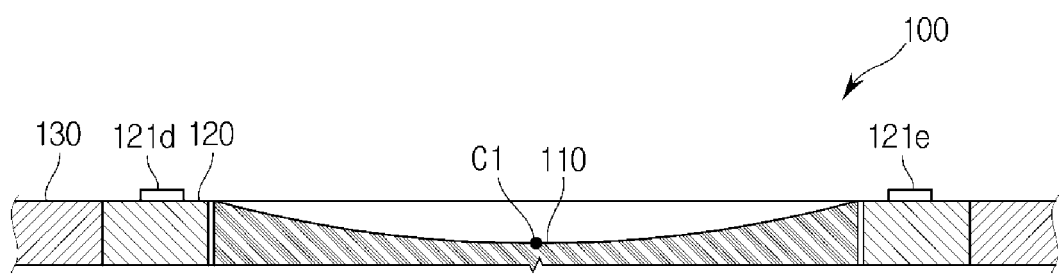
FIG. 3 is a cross-sectional view along line A-A of FIG. 2.

FIG. 3 is a cross-sectional view along line A-A of FIG. 2.

The touch device 110 may include a lower part than the level of a boundary with the border part 120 or mounting face 130. Specifically, the touch area of the touch device 110 may be located lower than the level of a boundary between the touch device 110 and the border part 120. For example, the touch device 110 may be inclined downward from the boundary with the border part 120 or may be located a step away from the border part 120. For example, the touch device 110 in accordance with the first embodiment of the present disclosure as shown in FIG. 3 includes a curved part including a concave curved plane.

In FIG. 3, the touch device 110 is inclined downward continuously without a step from the boundary with the border part 120. On the contrary, however, the touch device 110 may be inclined downward with a step down from the boundary with the border part 120.

With the touch device 110 including the lower part than the level of the boundary with the border part 120, the user may perceive the area and boundary of the touch device 110 with tactile sensation. Recognition rate may increase when the gesture is made on the center area of the touch device 110. Furthermore, even for similar gestures made, if the gestures are input at different positions, there are risks of the gestures being recognized as different commands. The problem is when the user inputs a gesture without looking at the touch area. It may be beneficial for the user to input a gesture in a right position if the user may intuitively recognize the touch area and the boundary with the tactile sensation while inputting the gesture in a state of looking at the display or focusing on an external circumstance. This may improve gesture input accuracy.

The touch device 110 may include a concave form. The concave form is a form of a dent or a sunken form, including not only the form that comes inside roundly but also the form that comes inside slantingly or with steps.

Furthermore, the touch device 110 may include a concave curved form. For example, the touch device 110 in accordance with the first embodiment of the present disclosure is implemented as a concave curved plane with a certain curvature. Specifically, the touch device 110 may include a form of a partial part of the inner side of a sphere. If the curvature of the touch device 110 is constant, user comfort may be improved when the user inputs a gesture.

The touch device 110 may include a concave form that may be gradually deepened toward the center from the outskirt part or may remain the same depth. In other words, the touch device 110 may be formed to not have any convex area. If the touch device 110 includes a convex area, it may interfere with the user inputting correct touches because the trajectory that the user is able to make gestures naturally and the curve of the touch area are different. In the touch device 110 shown in FIG. 1, the center C1 is at the deepest point and the curvature gradually decreases from the outskirts to the center C1.

The convex part refers to a swollen part not of a local area but of the overall touch area of the touch device 110. The touch device 110 may have a small projection in the center, allowing the user to intuitively feel the position of the center from the sense of the projection, or may include a protruding form in which thin wrinkles are made in the form of a concentric circle.

Alternatively, the curved plane of the touch device 110 may have different curvatures. For example, the touch device 110 may include a curved concave form in which the slope is gentler at a point nearer to the center. Specifically, the touch device 110 may be formed such that a curvature of an area near the center is small (which means the curvature radius is large), and a curvature near the outskirts is large (which means the curvature radius is small). As such, having the curvature of the center area of the touch device 110 be smaller than that of the outskirt area may help the user input a gesture with a pointer to the center area more easily. Since the curvature of the outskirt area is larger than that of the center area, the user may recognize the center location more easily even without looking at the touch device 110, by touching the outskirt area and sensing the curvature.

The inclusion of the concave curved plane in the touch device 110 of the touch control device 100 in accordance with the first embodiment of the present disclosure may improve a sense of touch (or a sense of manipulation) felt by the user while the user is inputting a gesture. The curved area of the touch device 110 may be formed to be similar to the trajectories to be drawn by movements of a fingertip of a human when he/she is making movements, such as moving the finger while fixing the wrist, or such as turning or twisting the wrists while opening the finger.

As in this embodiment of the present disclosure, the touch device 110 with the concave curved plane is ergonomic as compared with commonly-used flat touch devices. Accordingly, it may not only improve the feeling of touch manipulation of the user but also reduce tiredness on the wrist. Furthermore, as compared with the flat touch devices, the touch device 110 of the present disclosure may improve input accuracy.

The touch device 110 may be implemented in a round form. In this case, it is easy to form the concave curved plane. Moreover, being implemented in the round form, the touch device 110 may allow the user to easily make round gestures, such as rolling or spinning because the user may sense the round touch area of the touch device 110 by a tactile sense.

Being implemented as the concave curved plane, the touch device 110 may allow the user to be able to know intuitively of where his/her finger is on the touch device 110. The curved touch device 110 may make the slope of the touch device 110 different at every point. Accordingly, the user may know intuitively of where his/her finger is on the touch device 110 through a sense of the slope felt by his/her finger.

This feature may help the user input a desired gesture and improve input accuracy of the gesture by providing feedback about where his/her finger is on the touch device 110 while the user is inputting the gesture to the touch device with his/her eyes fixed on somewhere else than the touch device 110. For example, the user may intuitively know that he/she is touching the center area of the touch device 110 if the slope of the touch device 110 is felt flat from the sense of a finger of the user, and may intuitively know in which direction of the center area the finger is located by detecting the direction of the slope of the touch device 110 felt from the sense of the finger.

The diameter and depth of the touch device 110 may be determined within an ergonomic design range. For example, the diameter of the touch device 110 may be selected from within about 50 mm to about 80 mm. Considering an average length of the finger of an adult, a range in which the user is able to naturally move his/her finger at one time while fixing his/her wrist may be selected from within about 80 mm. If the diameter of the touch device 110 exceeds about 80 mm, movement of the user's finger becomes unnatural and the user may have to use his/her wrist more than necessary to draw a circle along the circumference of the touch device 110.

On the contrary, if the diameter of the touch device 110 is less than about 50 mm, the touch area is reduced, leading to a loss of diversity in gestures that may be input to the area. Furthermore, since the gestures are to be made in the small area, gesture input errors may increase.

Moreover, in the case that the touch device 110 has the form of a spherical face, the ratio of depth to diameter of the touch device 110 may be selected from a range between about 0.04 to about 0.1. The ratio of depth to diameter of the touch device 110 may refer to a degree of curve of the curved area. Specifically, for the same diameter, the larger the ratio of depth to diameter of the touch device 110, the more concave form the touch device 110 has, and on the contrary, the smaller the ratio of depth to diameter, the less concave form the touch device 110 has.

If the ratio of depth to diameter of the touch device 110 is larger than 0.1, the curvature of the concave form is large, which rather causes dissatisfaction with touch feeling of the user. The concave form of the touch device 110 may preferably be consistent with the curvature of a curve drawn by the user's fingertip while the user is naturally moving his/her finger. However, if the ratio of depth to diameter exceeds 0.1, it gives an unnatural feel of manipulation to the user while the user is moving his/her finger across the touch device 110. Furthermore, if the user naturally moves his/her finger in an unconscious state, the tip of the finger may be separated from the touch device 110. In this case, the touch of the gesture is discontinued, and recognition error occurs.

On the contrary, if the ratio of depth to diameter of the touch device 110 is smaller than 0.04, it is hard for the user to feel a difference in the sense of manipulation from what is felt in making a gesture on a flat touch device.

The touch pad used for the touch device 110 formed of a curved surface may detect touches in an optical method. For example, an infrared light emitting diode (IR LED) and photodiode array may be arranged on the back of the touch device 110. The IR LED and photodiode(s) may capture an IR image reflected by the finger, and the controller may extract a touch point from the captured image.

Figure 4:
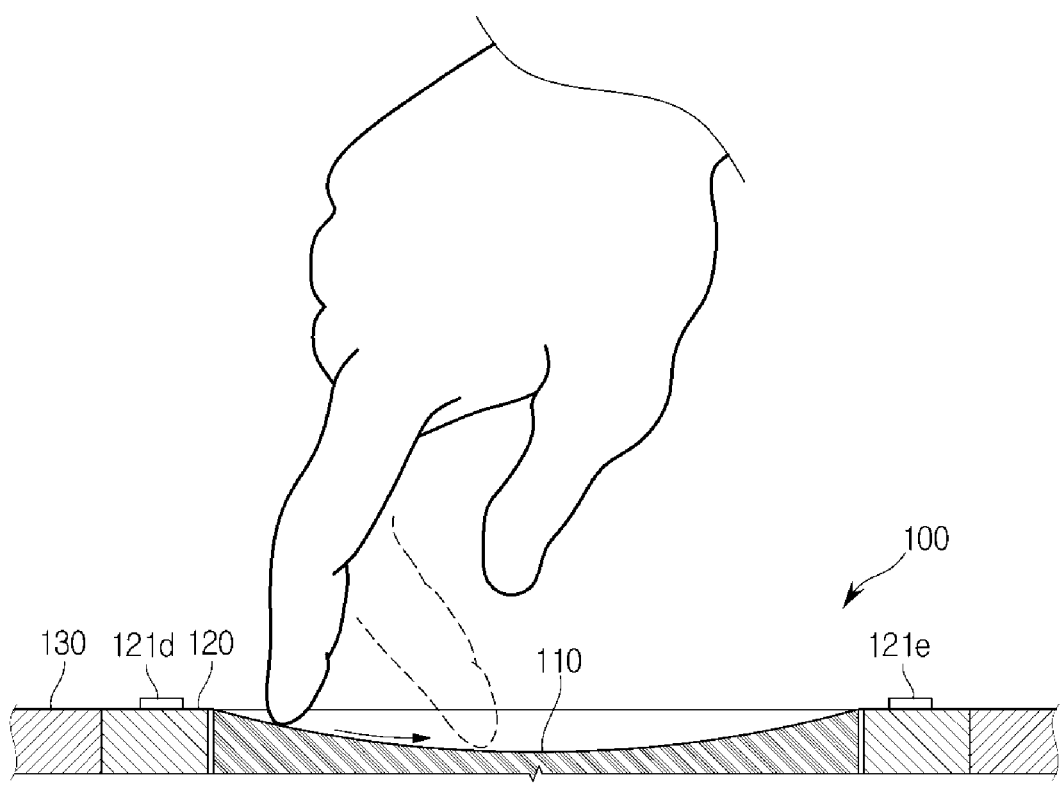
FIG. 4 shows a finger trajectory while the user is making a gesture in an up-and-down direction.
Figure 5:
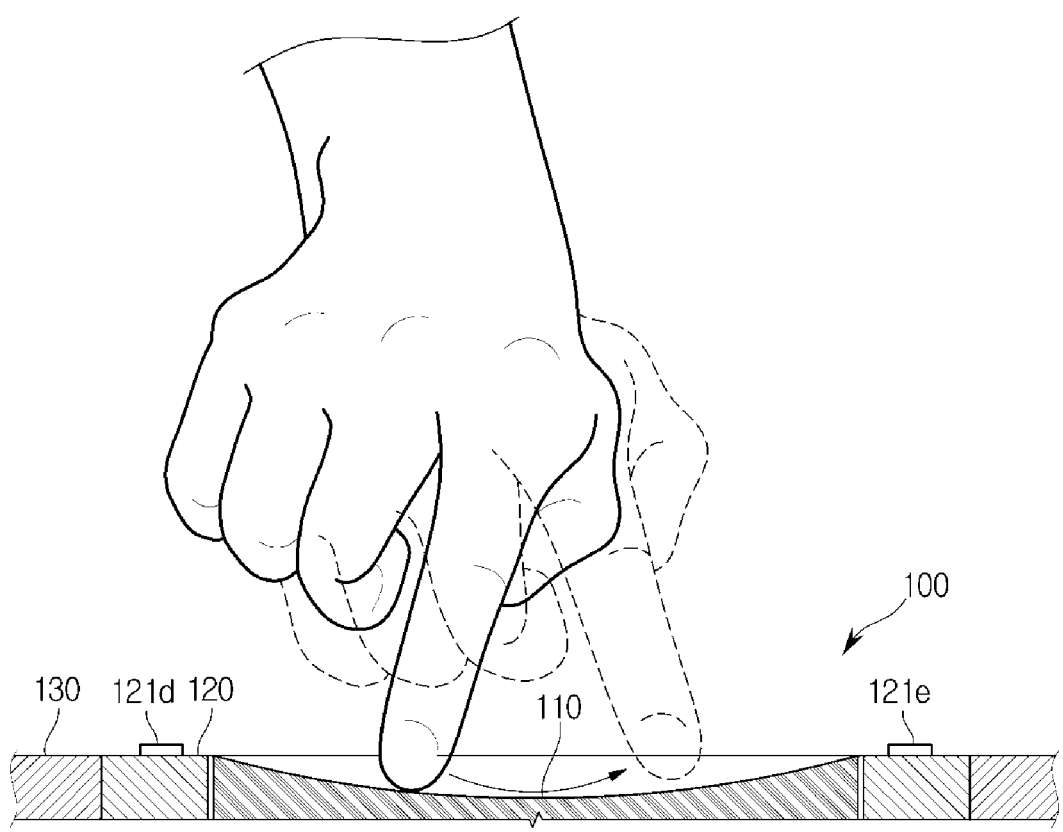
FIG. 5 shows a finger trajectory while the user is making a gesture in a left-and-right direction.

FIG. 4 shows a finger trajectory while the user is making a gesture in an up-and-down direction, and FIG. 5 shows a finger trajectory while the user is making a gesture in a left-and-right direction.

The touch device 110 includes a concave curved plane. The curvature of the touch device 110 may be determined to make the user feel comfortable making gestures on it. Referring to FIG. 4, the user may input a gesture only with natural movements of his/her finger without moving or bending other joints than the finger while moving his/her finger in the up-and-down direction. In the similar way, referring to FIG. 5, the user may input a gesture only with natural movements of his/her finger and wrist without excessively twisting the wrist while moving his/her finger in the left-and-right direction. As such, the form of the touch device 110 may be ergonomically designed, to reduce tiredness of the user from long time use of the touch device 110 and prevent musculoskeletal disorders.

In an embodiment of the present disclosure, the touch device 110 may include center and outskirt areas having different slopes or curvatures. The touch device 110 has a slope if it has the form of a flat plane or an incline plane, and has a curvature if it has the form of a curved plane.

Figure 6:
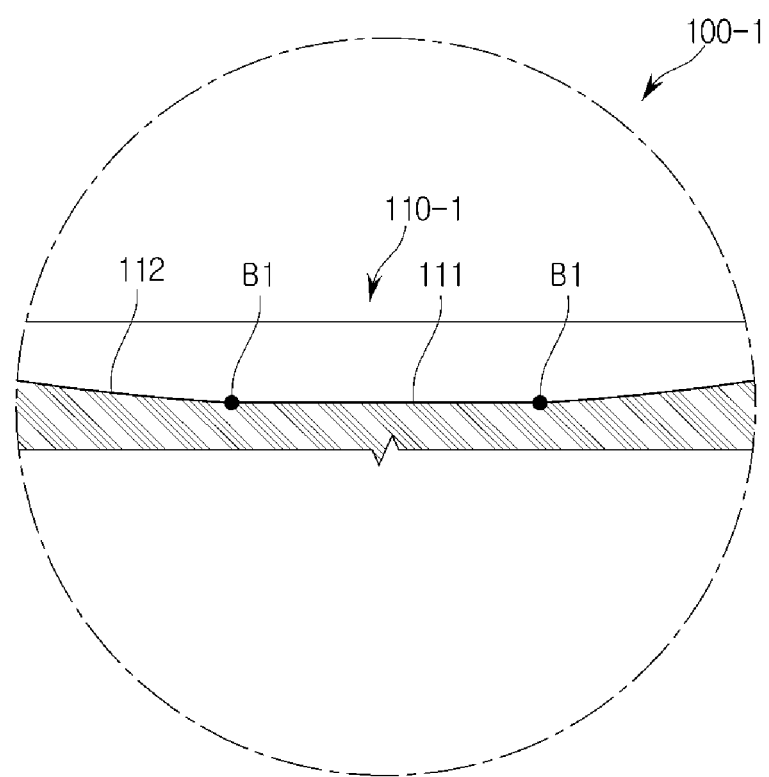
FIG. 6 is a cross-sectional view of a first modification of the touch control device according to the first embodiment in the present disclosure.
Figure 7:
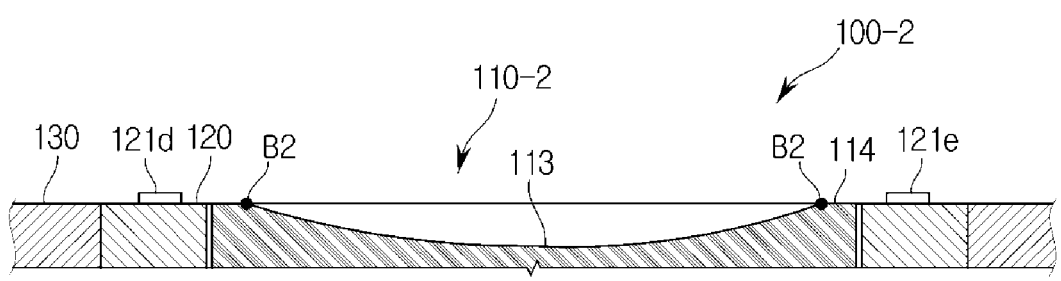
FIG. 7 is a cross-sectional view of a second modification of the touch control device according to the first embodiment in the present disclosure.

Different modifications of the embodiment are shown in FIGS. 6 and 7.

FIG. 6 is a cross-sectional view of a first modification 100-1 of the touch control device according to the first embodiment in the present disclosure.

Although not shown, a touch device 110-1 in the first modification 100-1 may be shaped like a circle (see FIG. 2). The touch device 110-1 may have a flat center area 111 and a concave curved outskirt area 112. A boundary B1 between the center area 111 and the outskirt area 112 may also be shaped like a circle.

The touch device 110-1 may be implemented with various ratios of widths of the center area and outskirt area 112, which may bring about different effects. For example, if the width of the center area 111 is relatively wide while the width of the outskirt area 112 is relatively narrow, the center area 111 formed to be flat may be used as an area for inputting gestures of e.g., characters and the outskirt area 112 formed to be curved may be used for facilitating input of circling gestures, such as rolling or spinning.

Otherwise, if the width of the center area 111 is relatively small while the width of the outskirt area 112 is relatively large, the outskirt area 112 formed to be curved may be used as an area for inputting gestures and the center area 111 may be used as a mark for the user to sense the center of the touch device 110-1.

Touch signals input to the center area 111 and outskirt area 112 may be distinguished from each other. For example, a touch signal to the center area 111 may mean a signal on a submenu, and a touch signal to the outskirt area 112 may mean a signal on the higher-level menu.

FIG. 7 is a cross-sectional view of a second modification 100-2 of the touch control device according to the first embodiment of the present disclosure.

A touch device 110-2 in the second modification 100-2 may have a concave curved center area 113 and a flat outskirt area 114. A boundary B2 between the center area 113 and the outskirt area 114 may be shaped like a circle.

Figure 8:
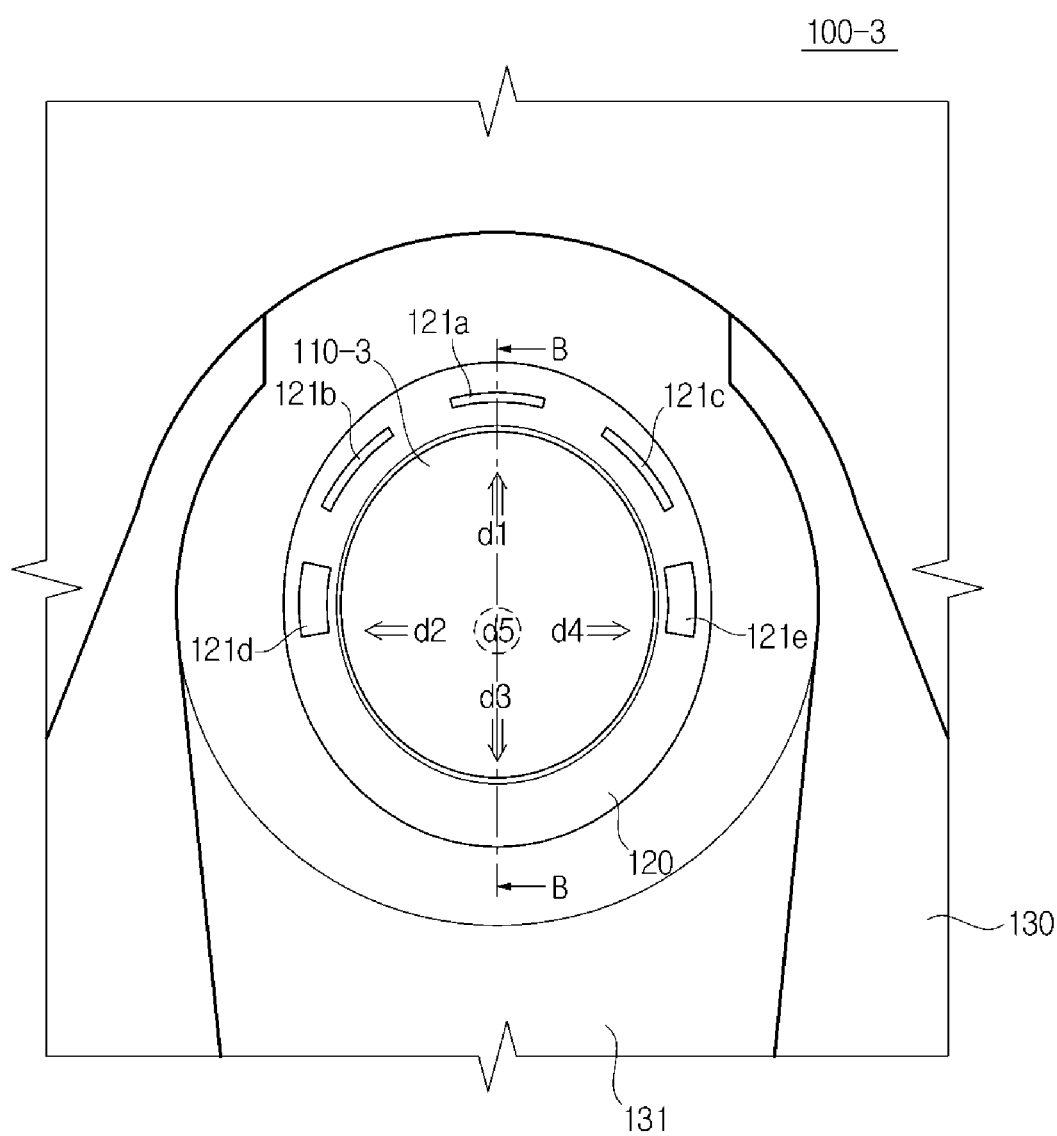
FIG. 8 is a cross-sectional view of a third modification of the touch control device according to the first embodiment in the present disclosure.
Figure 9:
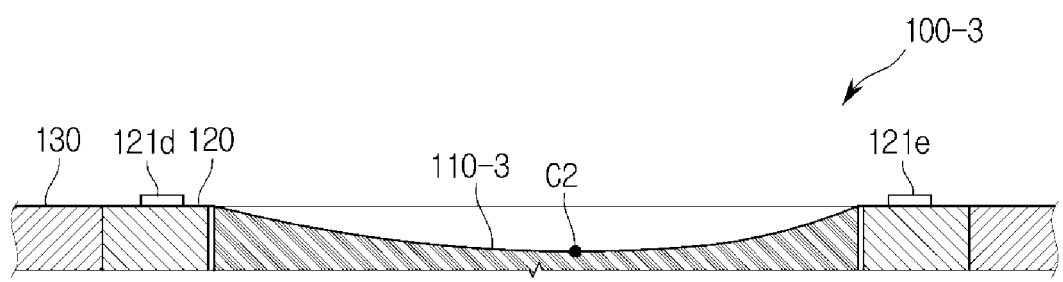
FIG. 9 is a cross-sectional view along B-B of FIG. 8.

Beside the shapes as shown in the modifications of FIGS. 6 and 7, the center area 111, 113 and the outskirt area 112, 114 may have other various shapes. It is also possible to form the center area 111, 113 and the outskirt area 112, 114 to be separated two or more steps apart from each other FIG. 8 is a cross-sectional view of a third modification 100-3 of the touch control device according to the first embodiment of the present disclosure, and FIG. 9 is a cross-sectional view along B-B of FIG. 8.

The touch device 110-3 in the third modification 100-3 may be shaped like an ellipse. For example, as shown in FIG. 8, vertical diameter may be larger than the horizontal diameter.

Furthermore, the lowest point C2 in the touch device 110-3 may be located nearer to one side from the center. For example, as shown in FIG. 9, the lowest point C2 may be located nearer to the downside.

Figure 10:
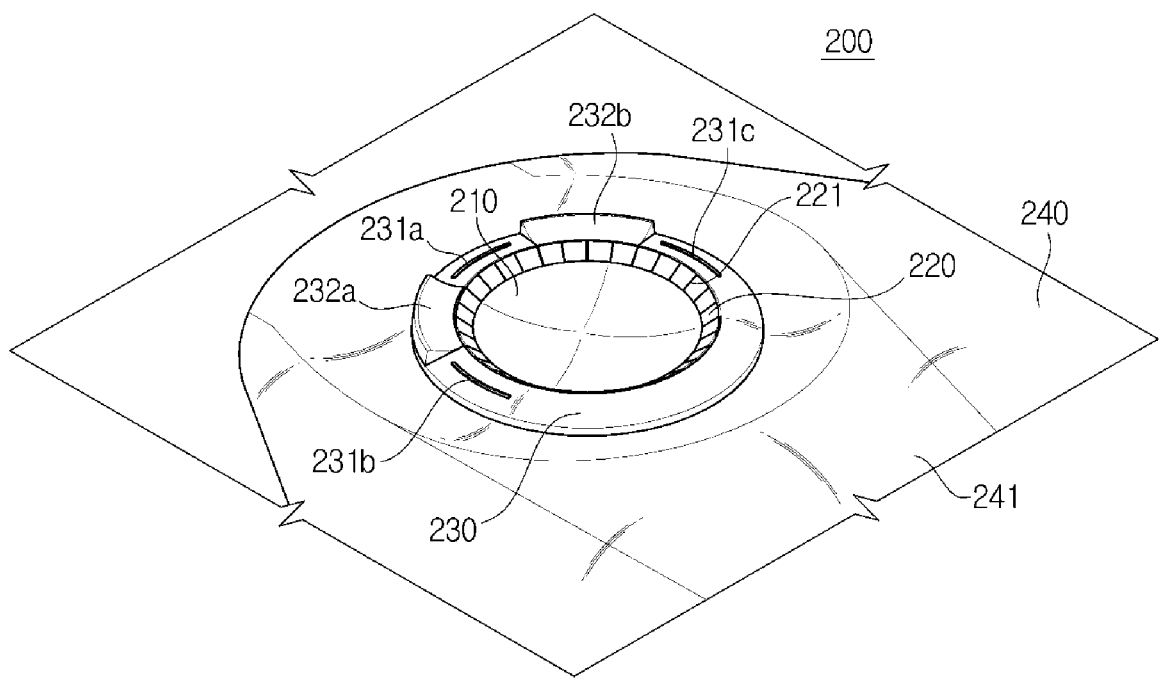
FIG. 10 is a perspective view of a touch control device, according to a second embodiment in the present disclosure.

FIG. 10 is a perspective view of a touch control device 200, according to a second embodiment of the present disclosure.

The touch control device 200 may include a touch device 210, 220 for allowing the user to input gestures by touches and a border part 230 enclosing around the touch device 210, 220.

The touch device 110 may include a gesture inputter 210 located in the center area, and a SWYPE inputter 220 located along the circumference of the gesture inputter 210. The SWYPE inputter 220 refers to a part for allowing input of SWYPE gestures, and the term 'SWYPE' means inputting gestures without taking a pointer away from the touch pad.

The touch device 210, 220 may be a touch pad to which a signal is input when the user contacts or approaches it with a pointer, such as his/her finger or a touch pen. The user may input a desired instruction or command by making a predetermined touch gesture on the touch device 210, 220.

Despite the name, the touch pad may include a touch film or touch sheet with a touch sensor. The touch pad may also include a touch panel, a display device with a touchable screen.

Recognizing the pointer's position while the pointer is not contacting but approaching the touch pad is called 'proximity touch', and recognizing the pointer's position when the pointer contacts the touch pad is called 'contact touch'. Proximity touch is made by recognizing a position on the touch pad corresponding vertically to a position in the air where the pointer approaches the touch pad.

The touch pad may use resistive methods, optical methods, capacitive methods, ultrasonic methods, or pressure methods. That is, the touch pad may be used in various methods known to the public.

The border part 230 may refer to an area that encloses around the touch device 210, 220, and may be formed of a separate member from that of the touch device 210, 220. There may be key buttons 232a, 232b or touch buttons 231a, 231b, 231c arranged on the border part 230 to surround the touch device 210, 220. The user may make a gesture on the touch device 210, 220, or may input a signal using the buttons 231, 232 arranged on the border part 230 around the touch device 210, 220.

The touch control device 200 may further include a wrist supporter 241 located down the touch device 210, 220 for supporting a wrist of the user. In this regard, the wrist supporter 241 may be located on a level higher than the touch area of the touch device 210, 220. When the user is making a gesture on the touch device 210, 220 with his/her finger while putting his/her wrist on the wrist supporter 241, the wrist supporter 241 prevents the user's wrist from being bent upward. Accordingly, it may prevent possible musculoskeletal disorders, and give more comfortable feeling of manipulation to the user.

Figure 11:
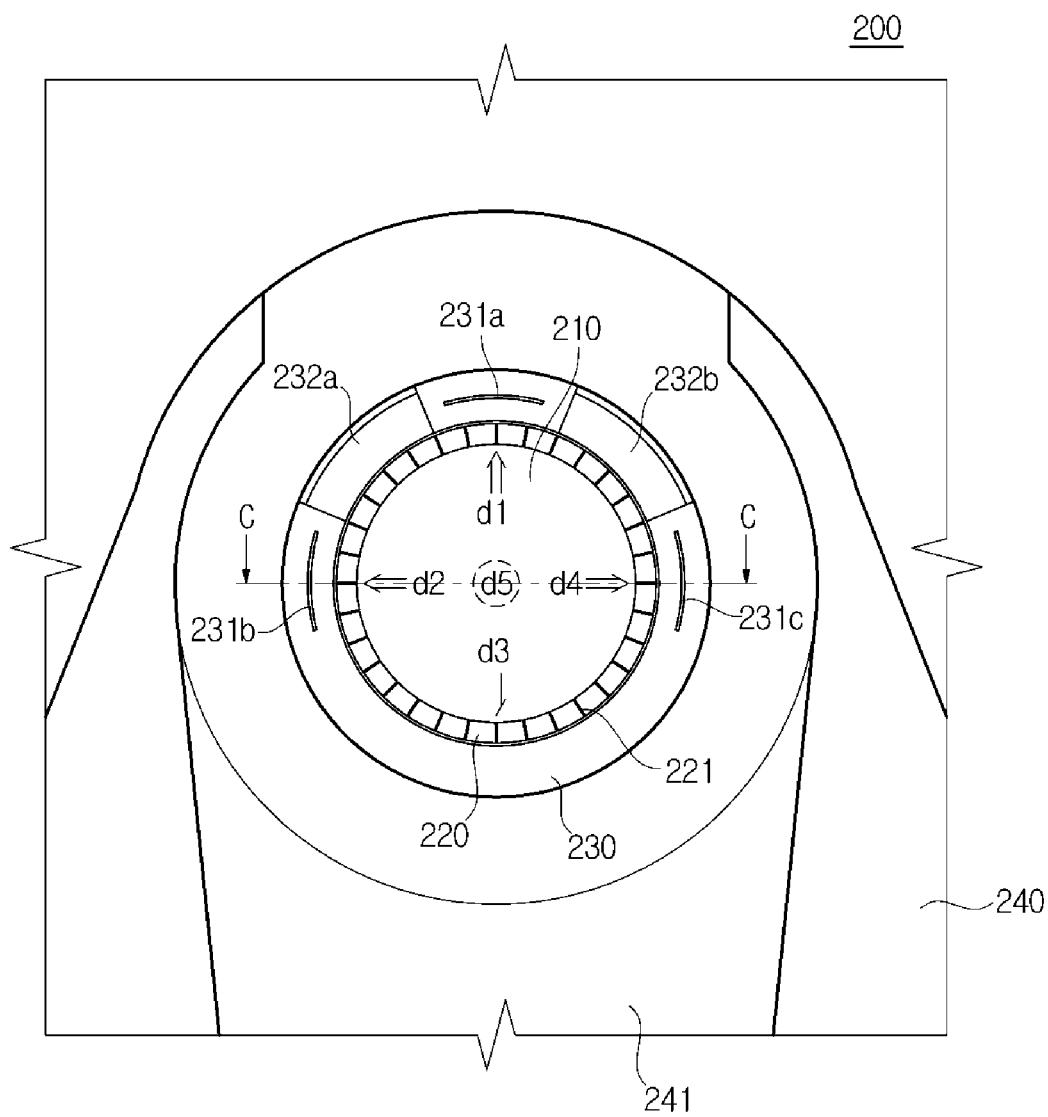
FIG. 11 is a plan view of the touch control device, according to the second embodiment in the present disclosure.
Figure 12:
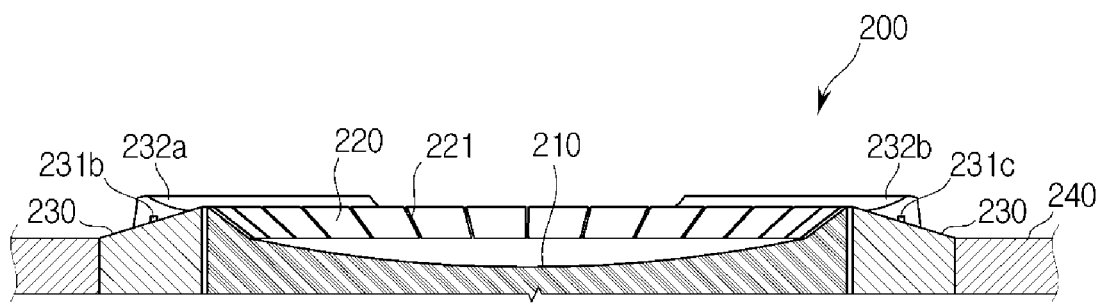
FIG. 12 is a cross-sectional view along C-C of FIG. 11.

FIG. 11 is a plan view of the touch control device 200, according to the second embodiment of the present disclosure, and FIG. 12 is a cross-sectional view along C-C of FIG. 11.

The touch device 210, 220 may include a lower part than the level of a boundary with a border part 230. Specifically, a touch area of the touch device 210, 220 may be located lower than the border part 230. For example, the touch device 210, 220 may be tilted downward from the boundary with the border part 230 or may be located a step away from the border part 230.

With the touch device 210, 220 located lower than the level of the boundary with the border part 230, the user may perceive the area and the boundary of the touch device 210, 220 with tactile sensation. Recognition rate may increase when the gesture is made on the center area of the touch device 210, 220. Furthermore, even for similar gestures made, if the gestures are input at different positions of the touch device 210, 220, there are risks of the gestures being recognized as different commands. The problem is when the user inputs a gesture without looking at the touch area. It may be advantageous for the user to input a gesture in a right position if the user may intuitively recognize the touch area and the boundary with the tactile sensation while inputting the gesture in a state of looking at the display or focusing on an external circumstance. This may improve accuracy in gesture input.

The touch device 210, 220 may include a gesture inputter 210 located in the center area, and a SWYPE inputter 220 located along the circumference of the gesture inputter 210 to be slanted downward. If the touch device 210, 220 has a round form, the gesture inputter 210 may be in the form of a part of the inner side of a sphere, and the SWYPE inputter 220 may be formed to be an incline plane that surrounds the circumference of the gesture inputter 210.

The user may input a SWYPE gesture along the round SWYPE inputter 220. For example, the user may input a SWYPE gesture clockwise or counterclockwise along the SWYPE inputter 220. Although circling gestures, such as rolling or spinning, or rubbing gestures in the left-to-right direction belong to the SWYPE gestures, the SWYPE gestures in embodiments of the present disclosure refer to the gestures input to the SWYPE inputter 220.

A SWYPE gesture made on the SWYPE inputter 220 may be input as a different gesture depending on the start and end points of the SWYPE gesture. For example, a SWYPE gesture made on a part of the SWYPE inputter 220 to the left of the gesture inputter 210 and a SWYPE gesture made on a part of the SWYPE inputter 220 to the right of the gesture inputter 210 may effect different operations. Furthermore, even if the user inputs SWYPE gestures by contacting the SWYPE inputter 220 from the same point with his/her finger, the gestures may be recognized as different ones if the user takes the finger away from the SWYPE inputter 220 at different end points.

The SWYPE inputter 220 may receive tapping gestures as well. For example, different commands or instructions may be input according to where the user taps on the SWYPE inputter 220.

The SWYPE inputter 220 may include a plurality of division lines 221. The division lines 221 may provide visual or tactile information about a relative position for the user. For example, the division lines 221 may be engraved or embossed. The division lines 221 may be arranged at uniform intervals. Accordingly, the user may intuitively know of the number of the division lines 221 that his/her finger has passed while in a SWYPE motion, and thus adjust the length of the SWYPE gesture.

For example, a cursor to be displayed on a screen may be moved according to the number of division lines 221 that the finger has passed in the SWYPE gesture. If various selected letters are consecutively displayed on a screen, selection of a letter may be moved over to the next one whenever a division line 221 is passed in the SWYPE motion of the user.

In an embodiment of the present disclosure, an inclination of the SWYPE inputter 220 may be greater than a tangential inclination of the gesture inputter 210 on the border between the SWYPE inputter 220 and the gesture inputter 210. The user may intuitively perceive the touch area of the gesture inputter 210 from a difference in inclination between the SWYPE inputter 220 and the gesture inputter 210 while making a gesture on the gesture inputter 210.

While a gesture is being input to the gesture inputter 210, recognition of a touch on the SWYPE inputter 220 may be disabled. Accordingly, even if the area of the SWYPE inputter 220 is violated while the user is making a gesture on the gesture inputter 210, the gesture input to the gesture inputter 210 and the gesture input to the SWYPE inputter 220 may not overlap.

The gesture inputter 210 and the SWYPE inputter 220 may be integrally formed. Touch sensors may be arranged in the gesture inputter 210 and the SWYPE inputter 220 separately or in a single unit. If there is a single touch sensor for the gesture inputter 210 and the SWYPE inputter 220, the controller may distinguish gesture input signals to the gesture inputter 210 from those to the SWYPE inputter 220 by distinguishing the touch area of the gesture inputter 210 from the touch area of the SWYPE inputter 220.

The touch control device 200 may further include a button input 231, 232. The button input 231, 232 may be located around the touch device 210, 220. The user may be able to input a gesture by manipulating the button input 231, 232 without changing the position of his/her hand, thereby giving a quick operation command.

The button input 231, 232 may include touch buttons 231a, 231b, 231c for performing designated functions when touched by the user, or pressure buttons 232a, 232b for performing designated functions while changing their positions by force applied by the user. If the touch buttons 231a, 231b, 231c are used, touch sensors may be included even in the button input 231, 232.

The pressure buttons 232a, 232b may slide in the up-and-down direction (to the outside of the surface) or to the inside of the surface by an external force. In the latter case, signals may be input while the user pulls or pushes the pressure buttons 232a, 232b. Alternatively, different signals may be input when the user pushes and pulls the pressure buttons 232a, 232b.

There are 5 buttons 231, 232 shown in the drawings. For example, the buttons 231, 232 may include a home button 231a to go to a home menu, a back button 231b to move the current screen to a previous screen, an option button 231c to move to an option menu, and two shortcut buttons 232a, 232b. The shortcut buttons 232a, 232b are to designate and move directly to a menu or device that the user uses frequently.

In an embodiment of the present disclosure, the button input means 231, 232 may have the touch buttons 231a, 231b, 231c located on the top and both sides, and have the pressure buttons 232a, 232b located between the touch buttons 231a, 231b, 231c. By placing the pressure buttons 232a, 232b between the neighboring touch buttons 231a, 231b, 231c, inadvertent operation of the touch button 231a, 231b, 231c may be avoided.

Figure 13:
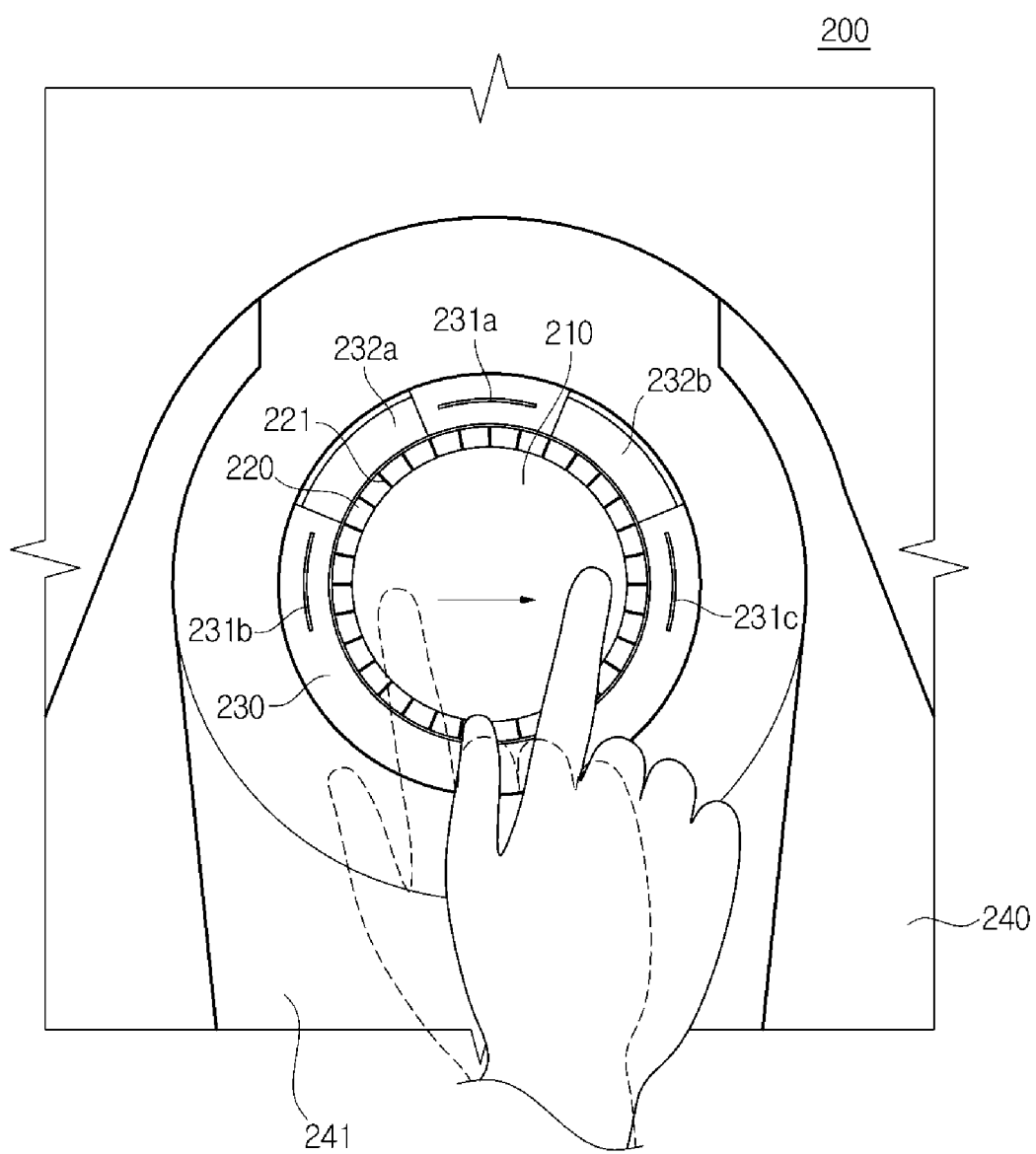
FIGS. 13 to 15 are plan views illustrating gesture input operation, SWYPE input operation, and pressing operation, respectively.
Figure 14:
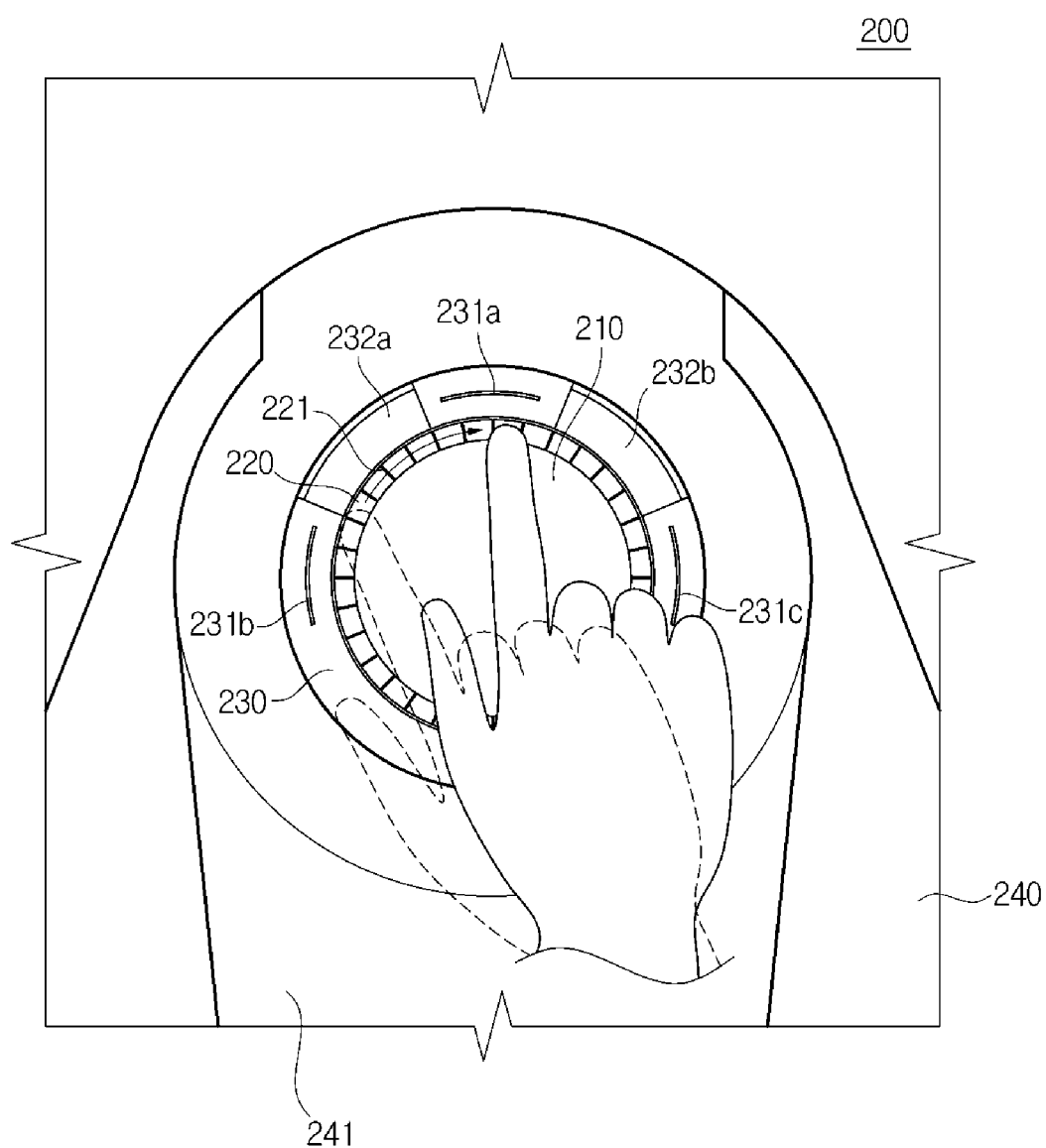
Figure 15:
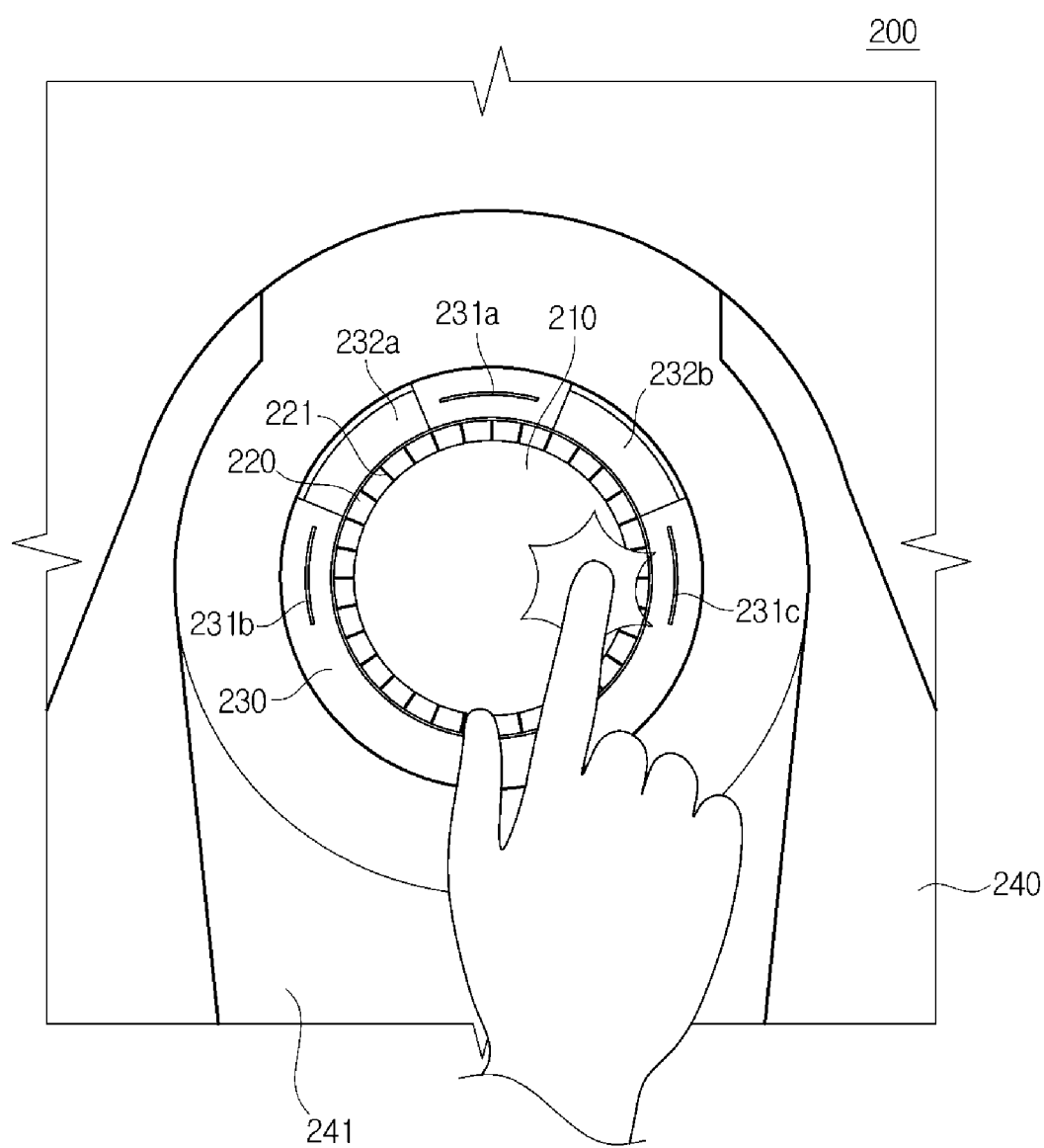

Operation of the touch input means 200 in accordance with the second embodiment of the present disclosure is described in connection with FIGS. 13 to 15. FIGS. 13 to 15 are plan views illustrating gesture input operation, SWYPE input operation, and pressing operation, respectively.

Referring to FIG. 13, the user may input an operation command by making a gesture on the gesture inputter 210. FIG. 13 illustrates a flicking gesture to move a pointer from left to right. Referring to FIG. 14, the user may input an operation command by rubbing the SWYPE inputter 220. FIG. 14 illustrates a SWYPE gesture that begins contact on the left part of the SWYPE inputter 220 and moves the pointer up along the SWYPE inputter 220. Referring to FIG. 15, the user may input an operation command by pressing the gesture inputter 210. FIG. 15 illustrates a gesture of pressing the left side of the gesture inputter 210.

Figure 16:
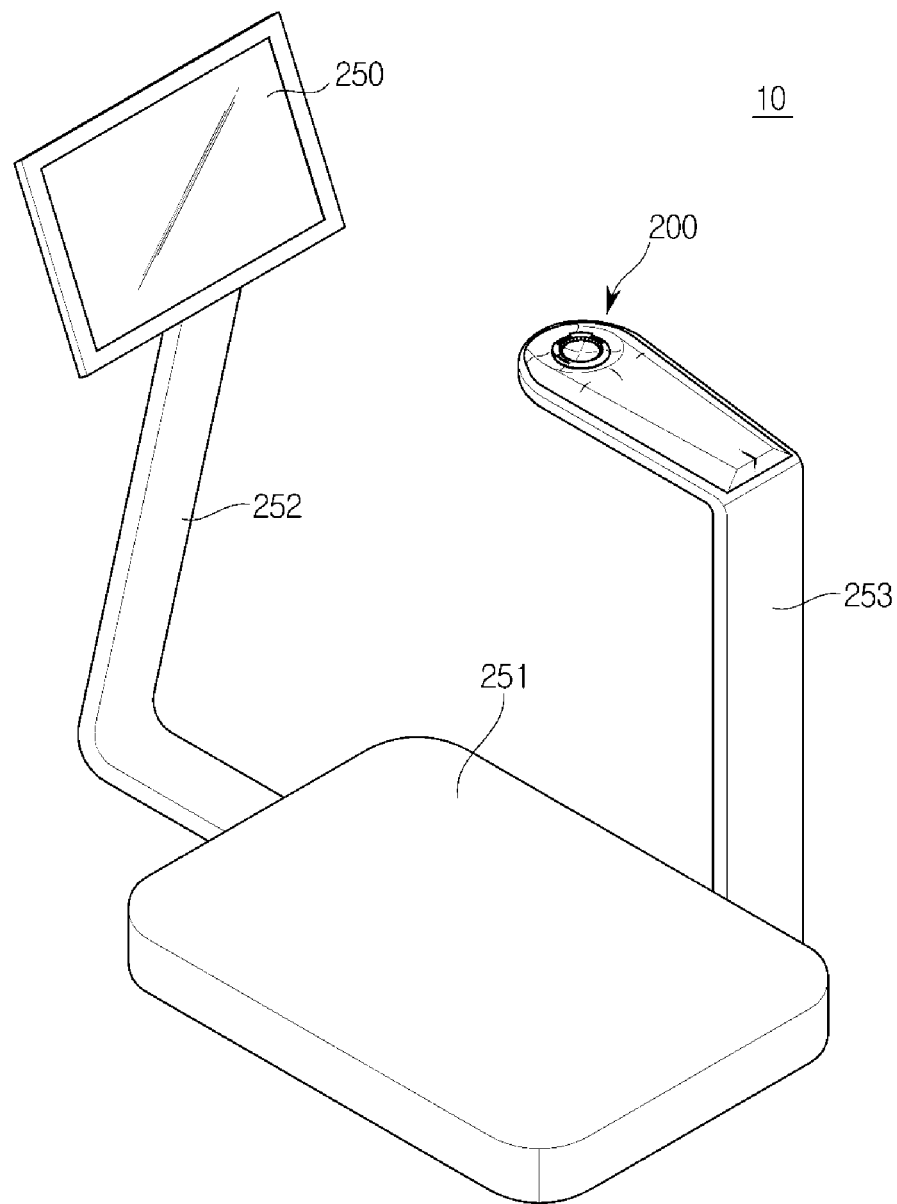
FIG. 16 is a perspective view of a healthcare device equipped with the touch control device in accordance with the second embodiment in the present disclosure.

FIG. 16 is a perspective view of a healthcare device 10 equipped with the touch control device 200 in accordance with the second embodiment of the present disclosure.

The touch control device 200 may be installed in the healthcare device 10. The healthcare device 10 may include medical equipment. The healthcare device 10 may include a main body 251 on which the user may stand, a display 250, a first connector 252 for connecting the main body 251 and the display 250, the touch control device 200, and a second connector 253 for connecting the touch control device 200 and the main body 251.

The main body 251 may measure various physical information including a weight of the user. The display 250 may display various image information including the measured physical information. The user may manipulate the touch control device 200 while looking into the display 250.

In an embodiment of the present disclosure, the touch control device 200 may be installed in a vehicle 20.

The vehicle 20 refers to any machine that transports people, animals, or cargo from a starting place to a destination. The vehicle 20 may include cars running on the road or track, ships traveling on the ocean or river, airplanes flying in the air with aeromechanics.

The cars that run on the road or track may travel in a desired direction by rotation of at least one wheel, and may include two-wheeled, three-wheeled, or four-wheeled automobiles, cars for construction and machinery, motorbikes or motor-equipped bicycles, or trains that run on the track.

Figure 17:
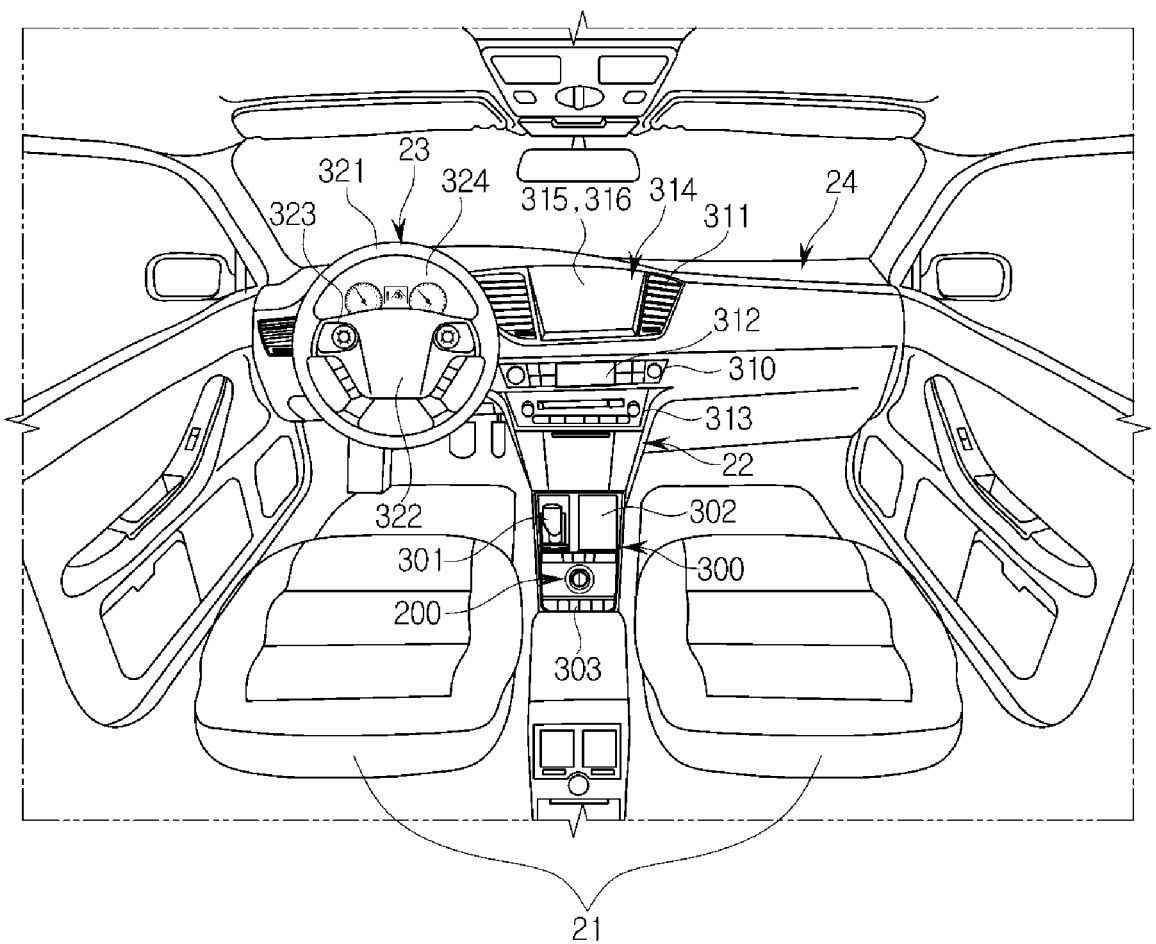
FIG. 17 shows the interior of the vehicle equipped with the touch control device in accordance with the second embodiment in the present disclosure.
Figure 18:
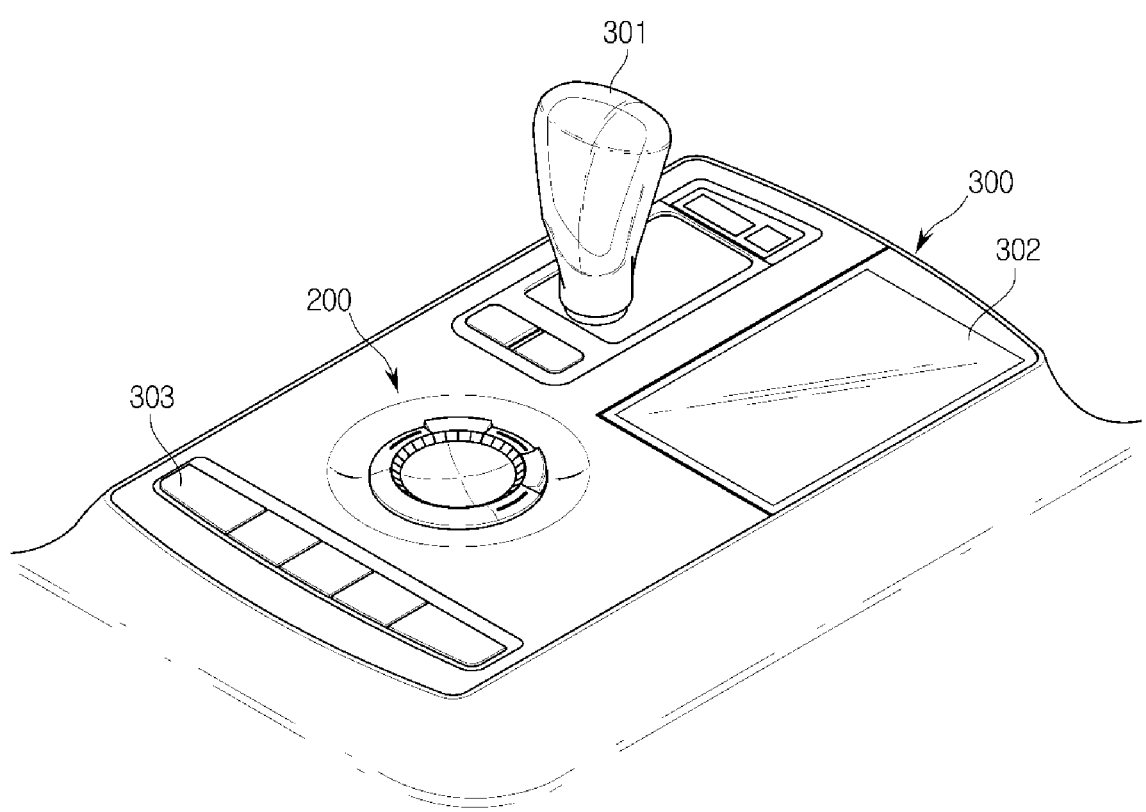
FIG. 18 is a perspective view of a gearbox equipped with the touch control device in accordance with the second embodiment in the present disclosure

FIG. 17 shows the interior of the vehicle 20 equipped with the touch control device 200 in accordance with the second embodiment of the present disclosure, and FIG. 18 is a perspective view of a gearbox 300 equipped with the touch control device 200 in accordance with the second embodiment of the present disclosure.

Referring to FIG. 17, the vehicle 20 may include seats 21 reserved for driver and passengers to sit on, a gearbox 300, a center fascia 22 and a dashboard 24 having a steering wheel 23.

In the center fascia 22, an air conditioner 310, a clock 312, an audio system 313, and an Audio, Video, and Navigation (AVN) system 314 may be installed.

The air conditioner 310 keeps the atmosphere inside the vehicle 20 pleasant by controlling temperature, humidity, air cleanness, and air flows inside the vehicle 20. The air conditioner 310 may include at least one vent 311 installed in the center fascia 22 for venting air. There may also be buttons or dials installed in the center fascia 22 to control e.g., the air conditioner 310. The driver or the user may control the air conditioner 310 with the buttons arranged on the center fascia 22.

The clock 312 may be arranged around the buttons or dials that control the air conditioner 310.

The audio system 313 may include a control panel on which a number of buttons are mounted to perform functionality of the audio system 313. The audio system 133 may provide a radio mode for radio listening and a media mode for reproducing audio files stored in various storage media.

The AVN system 314 may be embedded in the center fascia 22 of the vehicle 20, or may be arranged out on the dashboard 24. The AVN system 314 is a system for comprehensively performing audio, video and navigation functions of the vehicle 100 according to manipulation of the user. The AVN system 314 may include an inputter 315 for receiving user commands regarding the AVN system 314, and a display 316 for displaying a screen related to audio play, video play, or navigation functions. The audio system 313 may be omitted if it overlaps with the AVN system 314.

The steering wheel 23 is a tool to control a traveling direction of the vehicle 20, including a rim 321 to be held by the driver and a spoke 322 connected to a steering system of the vehicle 20 and connecting the rim 321 to a hub of a rotation shaft for steering. In an embodiment, a control device 323 may be formed on the spoke 322 to control various devices in the vehicle 20, e.g., the audio system.

The dashboard 24 may further include an instrument panel 324 for indicating various car information for the driver, such as vehicle speed, traveled distance, engine revolutions per minute (rpm), an amount of fuel left, temperature of a coolant, various warnings, etc., and a globe box for containing various things.

The gear box 300 may be installed between the driver seat and the passenger seat inside the vehicle 20, and equipped with some control devices required to be manipulated by the driver while the driver is driving the vehicle 20.

Referring to FIG. 18, in the gearbox 300, a transmission lever 301 for transmission of the vehicle 20, a display 302 for controlling the vehicle 20 to perform functions, and buttons 303 for activating various devices of the vehicle 20 may be installed. In addition, the touch control device 200 in accordance with the second embodiment of the present disclosure may be installed in the gearbox 300.

The touch control device 200 installed in the gearbox 300 may be positioned such that the user may be able to manipulate the touch control device 200 while keeping his/her eyes forward. For example, it may be located down the transmission lever 301. Alternatively, the touch control device 200 may be installed in the center fascia 22, in the passenger seat, or in the back seat.

The touch control device 200 may be connected to some display devices inside the vehicle 20 for selecting and executing various icons displayed in the display devices. The display devices installed inside the vehicle 20 may include the audio system 312, the AVN system 314, the instrument panel 324, or the like. Alternatively, the display 302 may be installed in the gearbox 300 if required. The display device may be connected to a Head Up Display (HUD) device or a rear view mirror.

For example, the touch control device 200 may move a cursor or execute an icon displayed on the display device. The icon may include a main menu icon, a menu selection icon, menu setting icon, etc. Furthermore, the user may operate GPS, or set driving conditions, or activate peripheral devices in the vehicle 20 through the touch control device 200.

A structure of a touch control device 400 will now be described in connection with FIGS. 19 to 21.

Figure 19:
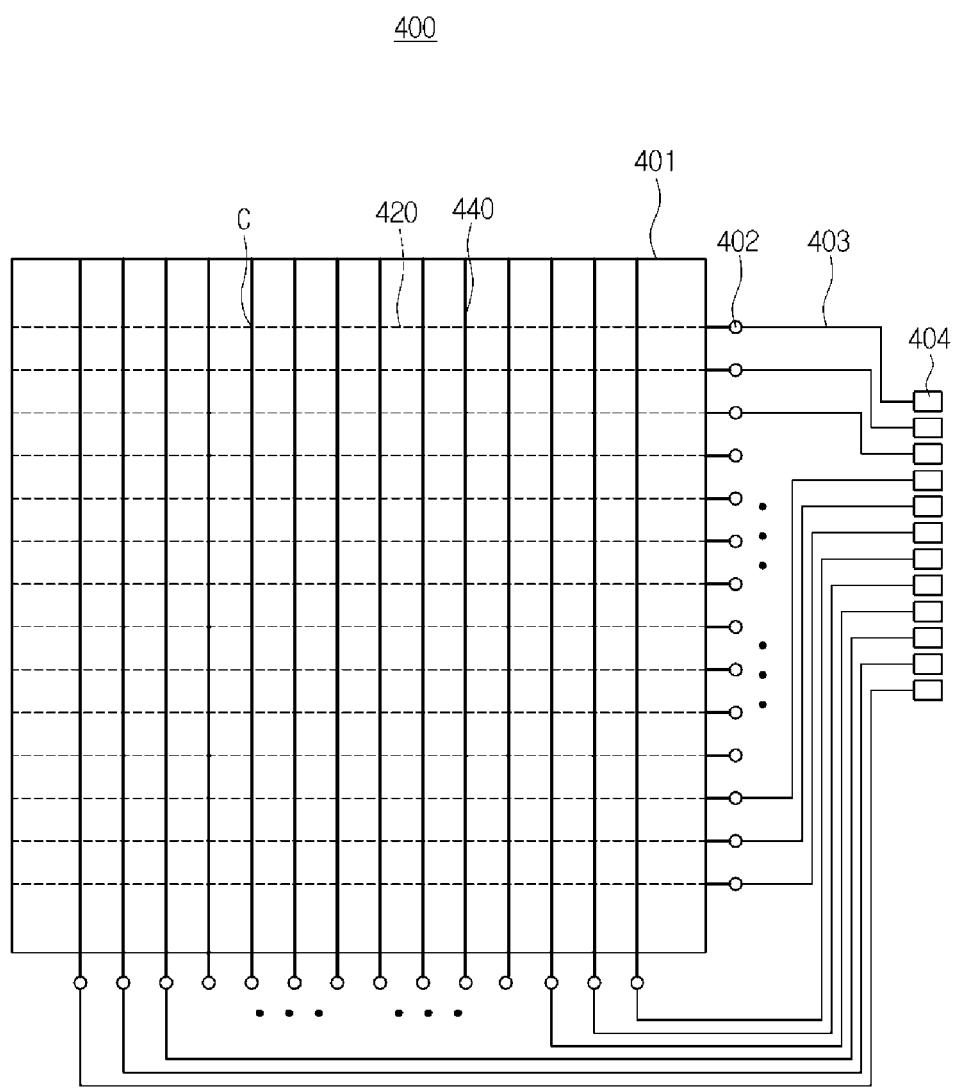
FIG. 19 is a structural diagram illustrating arrangement of electrodes of the touch control device, according to the second embodiment in the present disclosure.

FIG. 19 is a structural diagram illustrating arrangement of electrodes of the touch control device 400, according to the second embodiment of the present disclosure. Although actually different from what is shown in FIG. 19, FIG. 19 is a plan view representing how to operate the touch control device 400 for easy understanding.

The touch control device 400 may include a touch device 401 touchable with a user input means (e.g., a finger or touch pen), sensing patterns 420, 440 formed integrally with the touch device 401 or arranged below the touch device 401 for receiving touch signals, wires 403 connected to the sensing patterns 420, 440, and connecting pads 404 connecting the wires 403 to an integrated circuit 405.

The sensing patterns 420, 440 may include first sensing patterns 420 and second sensing patterns 440. The first sensing patterns 420 may be receive (RX) electrodes, and the second sensing patterns 440 may be transmit (TX) electrodes.

The first and second sensing patterns 420 and 440 may be formed in some patterns to detect changes in capacitance when the user contacts the touch control device 400 with his/her finger, a touch pen, etc., and thus detect the touched position. Contact (or touch) may be defined herein to imply both direct contact and indirect contact. Specifically, direct contact means an event when an object touches the touch control device 400, and indirect contact means an event when the object approaches into a range in which the sensing patterns may detect the object although the input control device 400 is not touched.

The touch control device 400 may employ both of a mutual capacitance method and a self capacitance method. In the self capacitance method, a change in capacitance is detected using an electrode for each unit pixel. If no multi-touch is required, the self capacitance method may be used. In the mutual capacitance method, a change in capacitance is detected at a crossing point of the sensing patterns formed in a lattice structure of electrodes. Accordingly, the mutual capacitance method enables multi-touch.

The first sensing patterns 420 may be arranged in a first direction (horizontal direction shown in FIG. 19) at uniform intervals, and the second sensing patterns 440 may be arranged in a different direction from the first direction (vertical direction shown in FIG. 19) at uniform intervals. The first sensing patterns 420 and the second sensing patterns 440 may be arranged on different layers, forming crossings C. At the crossings C, the first sensing pattern 420 and the second sensing pattern 440 do not come into direct contact with each other, but may overlap with an insulation between them.

The crossings C may define a resolution of the touch device 401, and may be recognized as coordinates. An input means coming into contact with any of the crossings C may be distinguished from the input means coming into contact with the neighboring crossing C, and what crossing position is contacted by the input means may be figured out. Accordingly, the more the crossings C are formed in the same area, the higher the resolution of the touch device 401 is.

Again, the first sensing patterns 420 may be TX electrodes. The first sensing patterns 420 are arranged in the first direction (in the horizontal direction as shown in FIG. 19) in parallel to one another at regular intervals, and the number of the lines of the patterns arranged at the regular intervals may correspond to a horizontal resolution.

The second sensing patterns 440 may be RX electrodes. The second sensing patterns 440 are arranged in the second direction (in the vertical direction as shown in FIG. 19) in parallel to one another at regular intervals, and the number of the line of the patterns arranged at the regular intervals may correspond to a vertical resolution.

One ends of the first and second sensing patterns 420, 440 may be connected to the wires 403 including a conductive material. The connecting pads 404 are located at one ends of the wires 403, and the respective wires 403 may be connected to the integrated circuit 405 through the connecting pads 404. For example, the wires 403 may be including metal wires One ends of the first and second sensing patterns 420, 440 may be connected to the wires 403 formed of metal. The connecting pads 404 are located at one ends of the wires 403, and the respective wires 403 may be connected to the integrated circuit 405 through the connecting pads 404.

Furthermore, there are connectors 402 arranged at the one ends of the first and second sensing patterns 420, 440 to be connected to the wires 403. The connectors 402 are electrically connected to the sensing patterns and have a width wider than that of the first or second sensing pattern 420, 440. This makes it easy to connect the first and second sensing patterns 420, 440 to the wires 403. The connectors 402 and the wires 403 may be stuck together by a conductive adhesive (e.g., by soldering).

Alternatively, the first and second sensing patterns 420, 440 may be integrally formed. In other words, the first and second sensing patterns 420, 440 may be connected up to the integrated circuit 405 for sending a touch signal input to the touch device 402 to the integrated circuit 405.

The wires 403 may deliver sensing signals of the sensing patterns 420, 440 to the integrated circuit 405 through the connecting pads 404. The wires 403 and the connecting pads 404 may be formed of a conductive material.

If an input means contacts an area of the touch device 401, capacitance at the crossings C is reduced, and information about the capacitance may be delivered through the wires 403 and connecting pads 404 to the integrated circuit 405 that serves as a controller, and the controller may determine what position has been contacted by the input means. Furthermore, the touch control device 400 may also be configured such that capacitance is reduced when the input means is approaching an area of the touch device 401. In this case, the controller may determine what position the input means is approaching.

Figure 20:
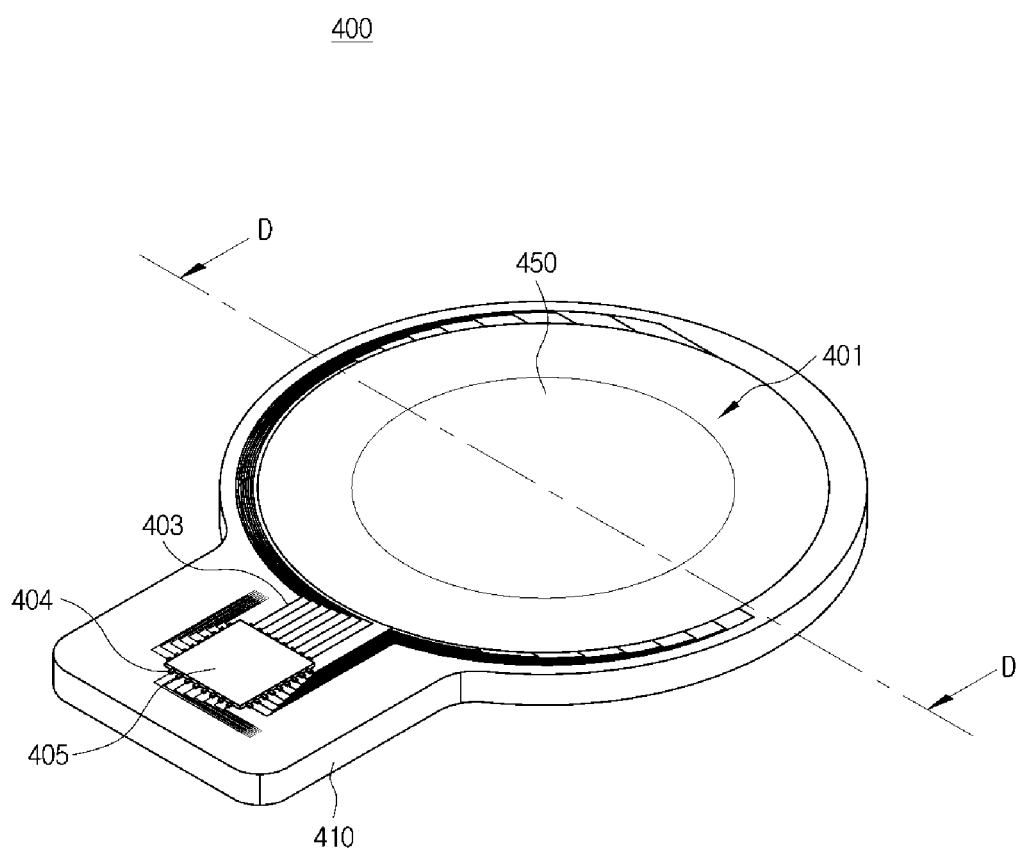
FIG. 20 is a perspective view of an inside of the touch control device, according to the second embodiment in the present disclosure.
Figure 21:
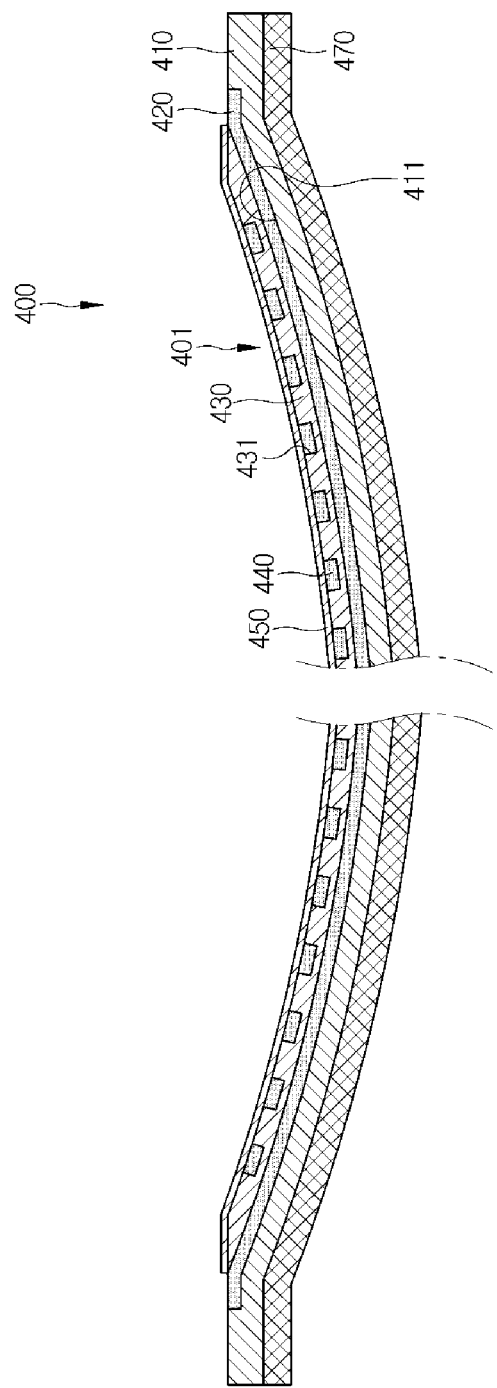
FIG. 21 is a cross-sectional view along D-D of FIG. 20.

FIG. 20 is a perspective view of an inside of the touch control device 400, according to the second embodiment of the present disclosure, and FIG. 21 is a cross-sectional view along D-D of FIG. 20.

The touch control device 400 may include a first base 410 including first pattern grooves, first sensing patterns 420 plated in the first pattern grooves 411, a second base 430 laminated on top of the first base 410 and including second pattern grooves 431, second sensing patterns 440 plated in the second pattern grooves 431, and an insulation layer 450 for insulating the second sensing patterns.

The first and second sensing patterns 420 and 440 may be formed on the first and second bases 410 and 430, respectively, using a Laser Direct Structuring (LDS) method. The LDS method refers to a method of forming a conductive structure in a region of a supporter member exposed to laser by forming the supporter member with a material including a non-conductive and chemically stable metal complex, exposing a metal seed by exposing a portion of the supporting member to laser, such as Ultra Violet (UV) laser or Excimer laser to break chemical bonding of the metal complex, and metalizing the supporting member. The LDS method is disclosed in Korean Patent No. 374667, and Korean Patent Publication Nos. 2001-40872 and 2004-21614, which are incorporated herein by reference.

Alternatively, the first sensing patterns 420 and the second sensing patterns 440 may be formed on one side of the first or second base 410, 430 by an injection molding process, an etching process, or a mechanical process. As an example of the mechanical process, three dimensional (3D) printing may be used.

The first and second sensing patterns 420, 440 may be formed of conductive materials, e.g., a metal. Especially, among metals, copper Cu may be used taking into account conductivity and economical efficiency. A different metal from the copper, such as gold Au may also be used to form the first and second sensing patterns 420, 440.

Plating and deposition used as a method to form the first and second sensing patterns 420 and 440 may employ common technologies widely known in the art without change.

Plating may be, in a wide sense, a process of coating the surface of an object with a thin metal layer. In this case, the plating may be a concept including deposition. On the other hand, the plating may be, in a narrow sense, a process of having an ionized metal stuck to metal seeds that exist on the surface with the patterns formed thereon. Deposition may be a process of having a metal in a state of plasma stuck to the surface with the patterns formed thereon in a vacuum condition. In this deposition process, masking may be used to have the metal selectively stuck only to the patterns. The plating may also include sputtering, a process of plating and deposition combined.

The first and second sensing patterns 420 and 440 may be formed by 3D electrode patterning. For example, a nozzle may coat electrodes while moving along the coordinates of the first and second sensing patterns 420, 440.

The first sensing patterns 420 may extend in the first direction (in the horizontal direction as shown in FIG. 19), the respective patterns being arranged in lines. The second sensing patterns 440 may extend in the second direction (in the vertical direction as shown in FIG. 19) perpendicular to the first direction, the respective patterns being arranged in lines. The crossing angle formed between the first and second sensing patterns 420 and 440 is not, however, limited to such a right angle.

The first and second sensing patterns 420 and 440 may include a form in which lozenge-shaped patterns are continuously connected. The shape of the pattern is not, however, limited to the lozenge, but may have any different form as needed. Neighboring lozenge-shaped patterns may be connected by connectors, and the connector may be formed in a bridge type that connects two patterns.

The first and second bases 410 and 430 may include a metal complex. For example, the first and second bases 410 and 430 may be a complex including resins and metal oxides. The resins may include one or more of Polycarbonate (PC), Polyamide (PA), and acrylonitrile-butadiene-styrene copolymer (ABS), and the metal oxides may include one or more of Mg, Cr, Cu, Ba, Fe, Ti, and Al.

On one side of the first base 410, formed are the first pattern grooves 411 for receiving the first sensing patterns 420, and on one side of the second base 430, formed are the second pattern grooves 431 for receiving the second sensing patterns 440. That is, the first and second sensing patterns 420, 440 may be arranged inside of the first and second pattern grooves 411, 431.

The first pattern grooves 411 may be formed by irradiating laser to one side of the first base 410, and the second pattern grooves 431 may be formed by irradiating laser to one side of the second base 430. In this case, the first and second bases 410, 430 are reduced to the metal by heat generated while the grooves are being formed, and the portion reduced to the metal forms a metal seed in the first and second pattern grooves 411, 431.

The first and second sensing patterns 420, 440 may be formed by being plated in the first and second pattern grooves 411, 431. A plating process on the metal seed may use a technology commonly known to the public, so the details will be omitted herein.

Alternatively, the first and second sensing patterns 420, 440 may be formed by a deposition process. In another example, it may also be formed by a combination of the plating and deposition processes. In the following description, it is assumed that the first and second sensing patterns 420, 440 are formed by a plating process.

The first and second sensing patterns 420, 440 may include copper plating, and may further plate the copper plating with nickel (Ni) to prevent oxidization. Meanwhile, if gold plating is used, it may improve conductivity.

The first and second bases 410, 430 may be formed by injecting and molding a metal complex, or by injecting and molding another material (e.g., resin, glass, leather, or the like) and then coating a metal complex thereon.

The first and second bases 410, 430 may be formed by being coated on one side of a basic member (not shown) formed of any of various materials. The basic member may include resin, glass, leather, rubber, or the like. The basic member may have stiff or elastic surfaces. The basic member may also be rigid or flexible. The basic member may be formed in an injection molding method. For example, the basic member may be formed in any shape through injection, and the first and second bases 410, 430 including metal oxides may be coated on the top or the bottom of the basic member.

The insulation layer 450 may be laminated on one side of the second base 430 to insulate the second sensing patterns 440. Alternatively, the insulation layer 450 may be omitted as necessary.

In an embodiment of the present disclosure, the touch control device 400 may be implemented to have one side (top side as shown in FIG. 21) of the insulation layer 450 serve as a touch face. For example, the second base 430 and the second sensing patterns 440 may be arranged on the other side of the insulation layer 450.

In this case, the insulation layer 450 may be formed to be a paint layer. The insulation layer 450 may prevent the second sensing patterns 440 from being exposed and contaminated by a pollutant. The insulation layer 450 may or may not be transparent. For example, the insulation layer 450 may be ultra violet (UV) coated.

Alternatively, the insulation layer 450 may be formed with resin or glass, or with leather or rubber. The insulation layer 450 may be formed of an injection material. For example, the insulation layer 450 may be formed by injecting a resin including polycarbonate (PC), polyamide (PA), acrylonitrile-butadiene-styrene copolymer (ABS), etc.

Figure 22:
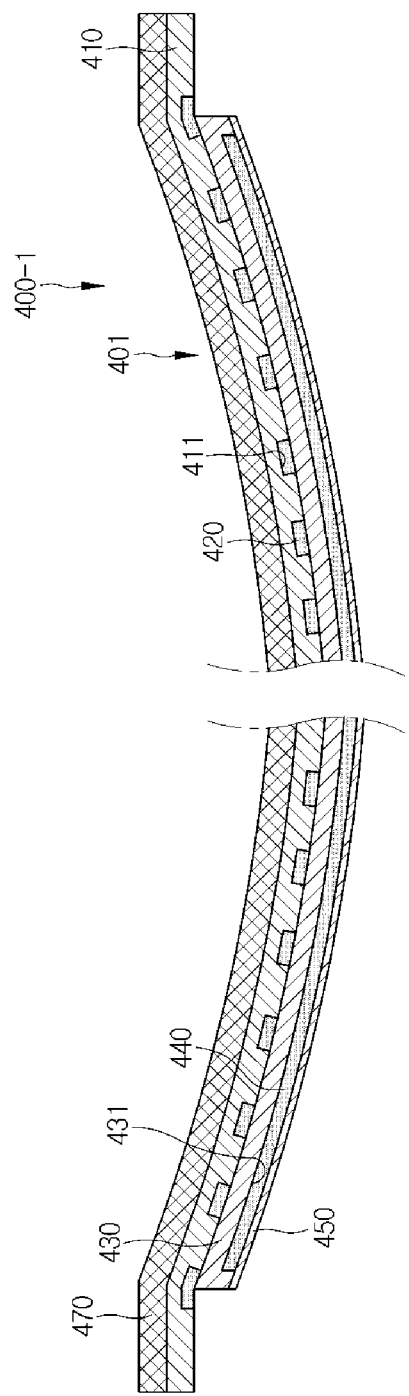
FIG. 22 is a cross-sectional view of the touch control device in accordance with another embodiment in the present disclosure as shown in FIG. 21.

In another embodiment of the present disclosure, a touch control device 400-1 may be implemented to have the other side (bottom side as shown in FIG. 22) of the first base 410 serve as a touch face. For example, the first sensing patterns 420 and the second base 430 are arranged on one side of the first base 410, and the other side of the first base 410 may be served as the touch face. In this case, the bottom direction in FIG. 2 may be a direction in which touch manipulation is made.

The touch control device 400 in accordance with the second embodiment of the present disclosure may have the touch device 401 formed in a curved plane. The first and second sensing patterns 420, 440 may be formed to curve along the curvature of the touch face.

The curved plane of the touch device 401 may include a curved plane with a constant curvature and a curved plane with changing curvatures. Furthermore, the curved plane of the touch input 401 may include a curved plane with two or more curvatures, and a curved plane curved in different directions depending on coordinates. Alternatively, the touch face of the touch control device 400 may have the form of a discontinuous plane. The form of the discontinuous plane may include a form of incline planes combined.

The first base 410 may be coated on one side of the basic member 470. The basic member 470 may be formed of resin or glass, or in addition, leather, rubber, or the like. The basic member 470 may be formed of an injection material as well.

For example, the basic member 470 may be formed by injecting a resin including PC, PA, ABS, etc.

The first base 410 have a curved plane on one side. For example, the one side of the first base 410 may have a partially spherical form. The first pattern grooves 411 may be formed on the curved plane of the first base 410. In this regard, since the first pattern grooves 411 are formed using laser, the first pattern groove 411 may be implemented to have a complicated form regardless of the shape of the first base 410.

The first sensing patterns 420 may then be plated in the first pattern grooves 411. In this regard, by nature of the plating process, the first sensing patterns 420 may be plated regardless of the shape of the first pattern grooves 411, which makes it easy to plate the first sensing patterns 420 even if the first pattern grooves 411 are not formed to be straight or planar.

The second base 430 may be formed to have a certain thickness on the first base 410. Accordingly, on one side of the second base 430, formed is a curved plane corresponding to the curvature of the first base 410. The second pattern grooves 431 may be formed on the curved plan of the second base 430. In this regard, since the second pattern grooves 431 are formed using laser, the second pattern groove 431 may be implemented to have a complicated form regardless of the shape of the second base 430.

The second sensing patterns 440 may then be plated in the second pattern grooves 431. In this regard, by nature of the plating process, the second sensing patterns 440 may be plated regardless of the shape of the second pattern grooves 431, which makes it easy to plate the second sensing patterns 440 even if the second pattern grooves 431 are not formed to be straight or planar.

The second base 430 may be formed in a certain thickness on the first base 410. Accordingly, on one side of the second base 430, formed is a curved surface corresponding to the curvature of the first base 410. The second pattern grooves 431 may be formed on the curved surface of the second base 430. In this regard, since the second pattern grooves 431 are formed using laser, the electric groove 431 may be implemented to have a complicated form regardless of the shape of the first base 430.

The second sensing patterns 440 may then be plated in the second pattern grooves 431. In this regard, by nature of the plating process, the second sensing patterns 440 may be plated regardless of the shape of the second pattern grooves 431, which makes it easy to plate the second sensing patterns 440 even if the second pattern grooves 431 are not formed to be straight or planar.

Furthermore, there are connectors arranged at the one ends of the first and second sensing patterns 420, 440 to be connected to the wires 403. The connectors are electrically connected to the sensing patterns and have width wider than the sensing pattern. The connectors may be electrically connected to the wires 403 by solder bonding.

The first and second sensing patterns 420, 440 may be formed with the wires 403 integrally. This will be explained later.

The first base 410 or the second base 430 may be formed by extending to an area where the wires 403 are arranged. For example, the first sensing patterns 420 and wires 403 may be formed on the first base 410, the second base 430 may be laminated on the first base 410 to cover the first sensing patterns 420, the second sensing patterns 440 may be formed on the second base, and the second sensing patterns 440 may be connected to the wires 403.

Finally, the insulation layer 450 may be coated for the second sensing patterns 440 not to be exposed to the outside. One side of the insulation layer 450 may be formed for the touch device 401.

FIG. 22 is a cross-sectional view of the touch control device 400-1 in accordance with another embodiment of the present disclosure as shown in FIG. 21.

Referring to FIG. 22, one side of the basic member 470 may be formed for the touch device 401. The first base 410 may be coated on the bottom face of the basic member 470. The remaining parts are the same as what are shown in FIG. 21.

How to input a touch signal to the gesture inputter 210 and the SWYPE inputter 220 will now be described by comparing FIGS. 12 and 21.

The first and second sensing patterns 420, 440 are formed to cover both of the gesture inputter 210 located in the center of the touch device 401 and the SWYPE inputter 220 located along the outer circumference of the touch device 401. That is, the first and second sensing patterns 420, 440 may be formed to extend up to the SWYPE inputter 220 past the gesture inputter 210.

For example, among the first and second sensing patterns 420, 440, patterns located on the outermost circumference may be arranged to correspond to the SWYPE inputter 220. Accordingly, if mutual capacitance of the first and second sensing patterns 420, 440 located on the outermost circumference of the touch device 401 changes, the controller may recognize that the user has touched the SWYPE inputter 220, and if mutual capacitance of the patterns other than those located on the outermost circumference among the first and second sensing patterns 420, 440 changes, the controller may recognize that the user has touched the gesture inputter 210.

As such, receiving touch signals by using the first and second sensing patterns 420, 440 to distinguish the gesture inputter 210 from the SWYPE inputter 220 may lead to simplification of a manufacturing process of the touch control device.

Electric connection between the first and second sensing patterns 420, 440 and the integrated circuit 405 will now be described with reference to FIGS. 23 to 26.

Figure 23:
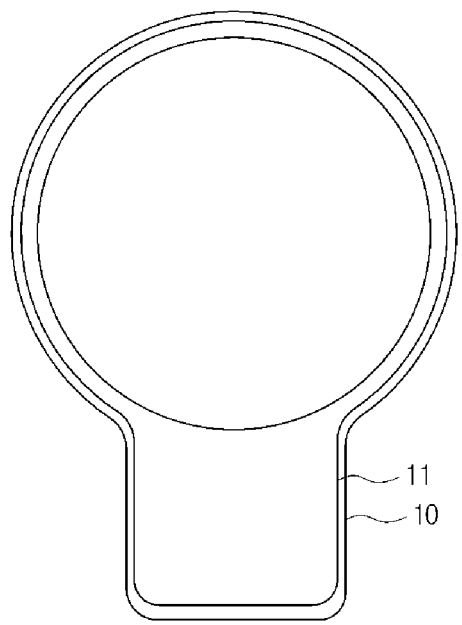
FIG. 23 illustrates comparative examples to represent connection between sensing patterns and an integrated circuit by attachment of an FPCB to an injection material: (a)
Figure 23:
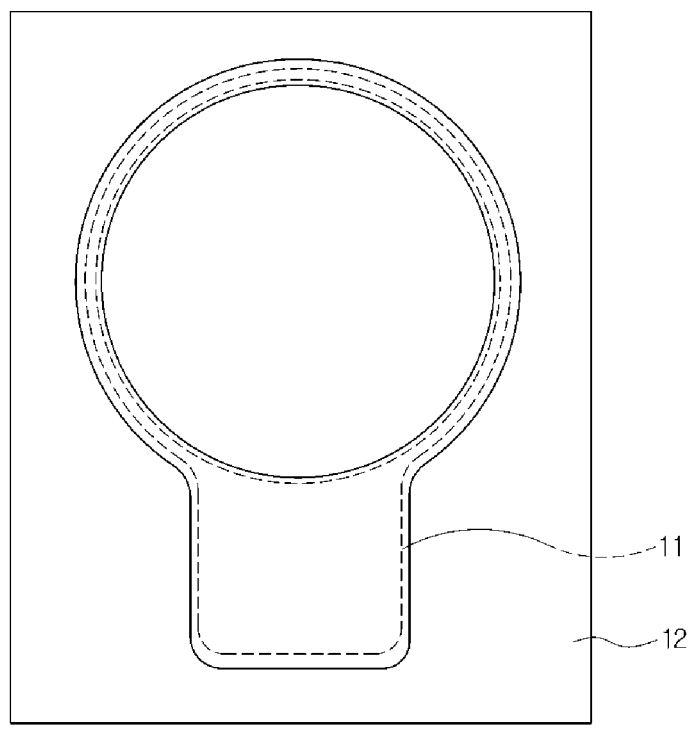

FIG. 23 illustrates comparative examples to represent connection between sensing patterns and an integrated circuit by attachment of an FPCB 11 to an injection material 10: (a) representing the FPCB 11 attached to the injection material 10, and (b) representing unused but discarded FPCB area 12.

In the past, the FPCB 11 was used to connect sensing patterns and an integrated circuit arranged in a touch area. Referring to (a) of FIG. 23, the FPCB 11 is tailored into a desired form, and then attached onto the injection material 10. The sensing patterns and integrated circuit are not shown in (a) of FIG. 23.

The FPCB is manufactured by a manufacturer into a rectangular form, and then supplied to a place for use. The place for use should tailor the rectangular FPCB to fit the shape of the injection material 10 and then use the tailored FPCB. However, in this process, there may an FPCB area 12 that is not used but discarded as shown in (b) of FIG. 23.

In light of the fact that the FPCB is very expensive, the discarded FPCB area 12 becomes a factor to increase the cost as much as the waste. Furthermore, the process becomes complicated because processes of tailoring the FPCB and attaching the FPCB to the injection material 10 are added. In addition, since the FPCB is attached to the injection material 10 by adhesion, vibration and high temperature may weaken the durability.

On the contrary, the touch control device 400 in accordance with an embodiment of the present disclosure does not require any extra FPCB because the first and second sensing patterns 420, 440 and the wires 403 may be formed together on the base 410.

FIG. 24 is a plan view illustrating the first sensing patterns 420 formed on the base 410, and FIG. 25 is a plan view illustrating the second sensing patterns 440 formed on the base 410. FIG. 26 is a plan view illustrating the integrated circuit 405 mounted on the base 410.

The wires 403 may include first wires 403a connected to the first sensing patterns 420 and second wires 403b connected to the second sensing patterns 440. The first and second wires 403a, 403b may be formed on one side of the first base 410. Specifically, the second wires 403b may be connected to the second sensing patterns 440 formed on one side of the second base 430, and may include a vertical connector for connecting the first base 410 and the second base 430 in the vertical direction.

The first wires 403a and the second wires 403b may be formed on the same plane, but arranged a distance away from each other.

The first and second sensing patterns 420, 440 and first wires 403a and second wires 403b may be formed with metal wires by plating or deposition after metal seeds are formed by exposing the base 410 to laser. In this case, the first and second sensing patterns 420, 440 arranged in the touch area, and the first wires 403a and second wires 403b connected to the integrated circuit 405 may be formed together in the same process. This is because laser patterning enables consecutive patterning on a curved plane or even on a discontinuous plane.

For example, referring to FIG. 24, the first sensing patterns 420 and the first wires 403a may be formed on the first base 410 at the same time. Specifically, using the continuous laser patterning, first pattern grooves in which the first sensing patterns 420 are formed are formed in the touch area and first wire grooves in which the first wires 403a connected to the first sensing patterns 420 and extending to an area where the integrated circuit 405 is arranged are formed. The first pattern grooves and the first wire grooves may be formed integrally or consecutively.

Metal wires may be formed in the grooves by a plating or deposition process.

Referring to FIG. 25, the first sensing patterns 420 are then covered by coating the touch area of the first base 410 with the second base 430. After this, using the continuous laser patterning, second pattern grooves in which the second sensing patterns 440 are formed are formed on the second base 430 in the touch area and second wire grooves in which the second wires 403b connected to the second sensing patterns 440 and extending to an area where the integrated circuit 405 is arranged are formed are formed on the first base 410. The second pattern grooves and the second wire grooves may be formed integrally or consecutively.

Metal wires may be formed in the grooves by a plating or deposition process. More specifically, the second pattern grooves are filled in by plating the second sensing patterns 440, and the second wire grooves are filled in by plating the second wires 403b. The second sensing patterns 440 and the second wires 403b may be formed integrally or consecutively.

A method for forming the first and second wire grooves may be the same as the methods for forming the first and second pattern grooves, and a method for forming the first and second wires 403a, 403b may be the same as the method for forming the first and second sensing patterns 420, 440.

Referring to FIG. 26, the integrated circuit 405 is then mounted on the first base 410. There may be connecting pads 404 arranged around the integrated circuit 405 to electrically connect the integrated circuit 405 to the first and second wires 403a and 403b.

Next, a method for manufacturing the touch control device 400 in accordance with the second embodiment of the present disclosure will be described in connection with FIGS. 27 to 34.

FIG. 27 is a flowchart illustrating a method for manufacturing the touch control device 400, according to the second embodiment of the present disclosure. FIGS. 28 to 34 illustrate a method for manufacturing the touch control device 400, according to the second embodiment of the present disclosure.

Figure 28:
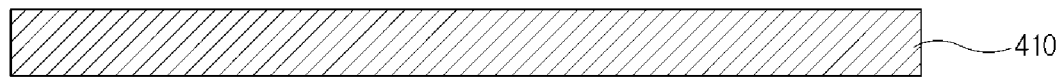

FIG. 28 shows a process S500 of preparing the first base 410.

The first base 410 may include a metal complex. For example, the first base 410 may be a complex including resins and metal oxides. The resins may include one or more of Polycarbonate (PC), Polyamide (PA), and acrylonitrile-butadiene-styrene copolymer (ABS), and the metal oxides may include one or more of Mg, Cr, Cu, Ba, Fe, Ti, and Al.

The first base 410 may be formed by being coated on a basic material (not shown). For example, the first base 410 including a metal complex may be coated on one side of the basic member formed of other materials, such as resin, glass, leather, or the like. The basic member may be about 1 mm to 1.5 mm thick, and the first base 410 may be coated in the thickness of a few to tens of ч m. The thickness of the basic member and the first base 410 is not limited thereto, and the basic member and the first base 410 may have any thickness as needed.

Alternatively, the first base 410 and the basic member may be integrally formed. For example, the first base 410 may be formed in an injection molding method. Accordingly, it may be easily manufactured into a desired form while reducing the waste of the materials. It may also be possible to manufacture the base 410 into various forms including a curved plane or a more complicated form.

Unlike what is shown in the drawings, a curved plane may be formed on one side of the first base 410. For example, the one side of the first base 410 may have a concave curved plane in a partially spherical form.

Figure 29:
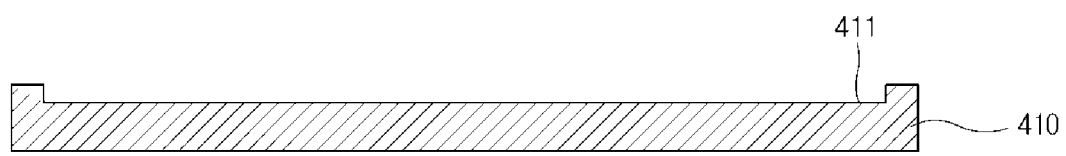

FIG. 29 shows a process S510 of processing the first pattern grooves 411.

The first pattern grooves 411 are formed by irradiating laser, such as UV laser or excimer laser onto one side of the first base 410. In this case, the heat generated while the groove is being formed breaks the chemical bonding of the metal complex to be reduced to a metal, forming a metal seed in the first pattern groove 411.

The first pattern grooves 411 may be formed on a curved side of the first base 410. Since the grooves are formed by laser irradiation, various patterns may be made without regard to the surface form of the first base 410.

Figure 30:
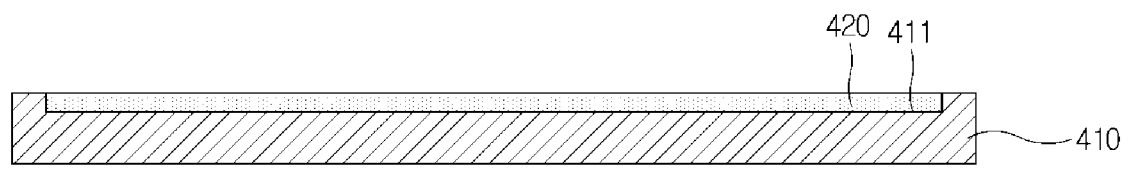

FIG. 30 shows a process S520 of forming the first sensing patterns 420.

The first sensing patterns 420 may be formed by metalizing the first pattern grooves 411 that expose the metal seeds. For example, the first sensing patterns 420 include copper to be plated in the first pattern grooves 411. For anti-oxidation process, nickel may be plated on the copper plating.

Figure 31:
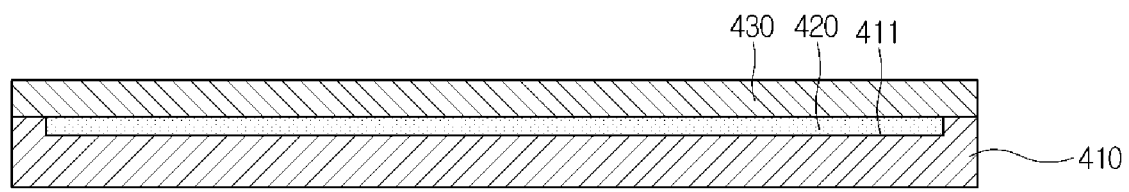
Figure 32:
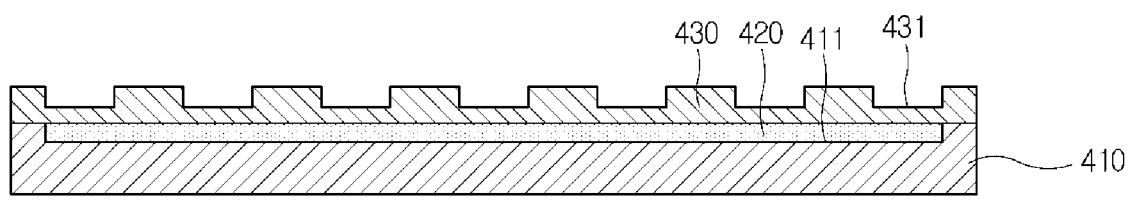
Figure 33:
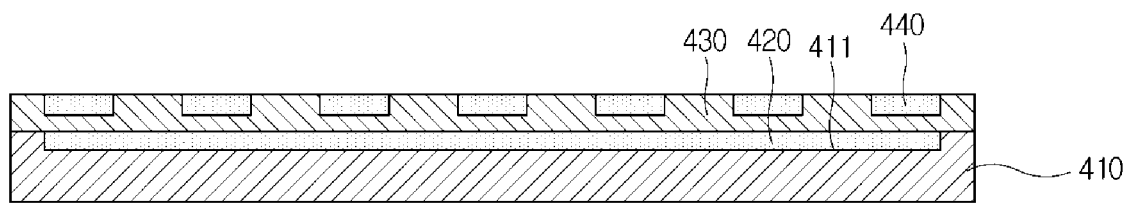

FIG. 31 shows a process S530 of laminating the second base 430, FIG. 32 shows a process S540 of processing the second pattern grooves 431, and FIG. 33 shows a process S550 of forming the second sensing patterns 440.

The second base 430 may be formed of a metal complex, and may be formed by being coated on the first base 410. The same processes of FIGS. 31 to 33 as those of FIGS. 28 to 30 will be omitted herein.

Figure 34:
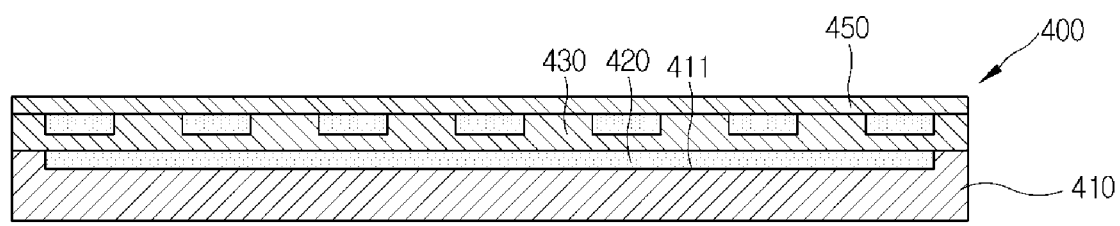

FIG. 34 shows a process S570 of laminating the insulation layer 450.

The insulation layer 450 may be formed by being coated on the second base 430 for protecting the second sensing patterns 440 against external shock or pollutants. The insulation layer 450 may be configured to be a touch face of the touch device 401 for the user to contact.

The insulation layer 450 may be formed by UV painting or UV coating that uses a sunscreen agent.

Although not shown, the manufacturing method may further include a verification process S560 of verifying whether the touch control device 400 manufactured by the processes shown in FIGS. 28 to 34 is working properly.

The verification process S560 includes applying current to the first and second sensing patterns 420, 440, examining a change in mutual capacitance between the two sensing patterns, and determining whether the patterns fit for sensors based on the examination result. This is because, to function as a product, the touch control device 400 should detect a position touched by an input means by detecting a change in mutual capacitance between the first and second sensing patterns 420, 440 when the input means comes into contact with the touch device 401.

The examination process S560 may be performed before the process S570 of laminating the insulation layer 450. This is because there may be an occasion when the second sensing patterns 440 need to be fixed because it is deemed unfit in the examination process S560.

FIG. 35 is a cross-sectional view of a touch control device 400-2, according to another exemplary embodiment in the present disclosure.

Referring to FIG. 35, the touch control device 400-2 may include a base 410-1, first pattern grooves 411 formed on one side of the base 410-1, second pattern grooves 412 formed on the other side of the base 410-1, first sensing patterns 420 plated in the first pattern grooves 411, second sensing patterns 440 plated in the second pattern grooves 412, a first insulation layer 450-1 coated on the one side of the base 410-1, and a second insulation layer 450-2 coated on the other side of the base 410-1.

The touch control device 400-2 in accordance with the present embodiment of the present disclosure may have first and sensing patterns 420 and 440 formed on either side of the base 410-1. Since the single base 410-1 is used to form two layers of sensing patterns, the touch control device 400-2 becomes a thin and slim product.

FIG. 36 is a flowchart illustrating a method for manufacturing the touch control device 400-2, according to the third embodiment of the present disclosure.

The method for manufacturing the touch control device 400-2 includes preparing a base 410-1 in S600, processing the first pattern grooves 411 on one side of the base 410-1 in S610, forming the first sensing patterns 420 by plating them in the first pattern grooves 411 in S620, turning the base 410-1 upside down and processing the second pattern grooves 412 on the other side of the base 410-1, S630, forming the second sensing patterns 440 by plating them in the second pattern grooves 412 in S640, laminating the first insulation layer 450-1 on the one side of the base 410-1 to protect the first sensing patterns 420, in S660, and laminating the second insulation layer 450-2 on the other side of the base 410-1 to protect the second sensing patterns 440, in S670.

Alternatively, the process S610 of processing the first pattern grooves 411 on one side of the base 410-1 and the process S630 of processing the second pattern grooves 412 on the other side of the base 410-1 may be performed simultaneously or sequentially. The process S620 of plating the first sensing patterns 420 and the process S640 of plating the second sensing patterns 440 may also be performed simultaneously or sequentially.

A verification process S650 of verifying whether the first and second sensing patterns 420 and 440 are operating normally may be performed before laminating the first and second insulation layers 450 in S660, S670.

FIG. 37 is a cross-sectional view of a touch control device 400-3, according to another exemplary embodiment in the present disclosure.

Referring to FIG. 37, the touch control device 400-3 may include a base 410-2, first pattern grooves 411 and second pattern grooves 412 formed on one side of the base 410-2, first sensing patterns 420 plated in the first pattern grooves 411, second sensing patterns 440 plated in the second pattern grooves 412, and an insulation layer 450 coated on the one side of the base 410-2.

The touch control device 400-3 in accordance with the fourth embodiment of the present disclosure may have both of the first and second sensing patterns 420 and 440 formed on one side of the base 410-2. Since the single base 410-2 is used to form two layers of sensing patterns, the touch control device 400-2 may be manufactured as a thin and slim product.

The first sensing patterns 420 and the second sensing patterns 440 may not be connected to each other but may be separated by a certain distance. The first and second sensing patterns 420 and 440 may not cross each other. The patterns may have various forms. For example, U.S. Patent Publication No. 2015-0234492 discloses a plurality of patterns formed on one face.

FIG. 38 is a flowchart illustrating a method for manufacturing the touch control device 400-3, according to the fourth embodiment in the present disclosure.

The method for manufacturing the touch control device 400-3 includes preparing a base 410-2 in S700, processing the first pattern grooves 411 and second pattern grooves 412 on one side of the base 410-2 in S710, forming the first sensing patterns 420 by plating them in the first pattern grooves 411 and forming the second sensing patterns 440 by plating them in the second pattern grooves 412 in S720, and laminating the insulation layer 450 on the one side of the base 410-2 to protect the first and second sensing patterns 420, 440, in S740.

A verification process S730 of verifying whether the first and second sensing patterns are operating normally may be performed before laminating the insulation layers 450 in S740.

According to embodiments of the present disclosure, a touch control device may be manufactured using a Laser Direct Structuring (LDS) method, thereby simplifying the manufacturing process and reducing processing costs.

Also, the touch control device may be safe from vibration and shock and may have improved durability, by not using any adhesion process in forming the sensing patterns on a base.

Furthermore, the base having a touch area formed thereon may be integrally formed by extending even to a part linking the base to an integrated circuit, and thus the manufacturing process may be simplified and the processing costs may be reduced.

The manufacturing costs may further be reduced by forming the base in an injection molding method.

Moreover, the touch control device may have improved durability against high temperature and vibration by minimizing a bonding part used to electrically connect sensing patterns to the integrated circuit.

It also makes it easy to form sensing patterns even when a touch device has the form of a curved plane. Especially, even if the touch device is formed to have multiple curvatures, the sensing patterns may be formed.

Moreover, since the touch control device is manufactured under a high heat condition using laser, it may have improved reliability even when the product of the touch control device is used in high-temperature environments.

Even if the touch control device is required to be manufactured into various sizes, it may be processed without extra modification of the manufacturing tools, thereby reducing the manufacturing time and costs.

Multiple exemplary embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A touch control device comprising:
    a base including a metal complex and integrally provided with a first area into which a touch signal is input and a second area in which an integrated circuit is mounted;
    a first pattern groove formed on a first side of the base by irradiating laser to the first side of the base;
    a second pattern groove formed on a second side of the base by irradiating laser to the second side of the base;
    a first sensing pattern disposed in the first pattern groove in the first area and including a first conductive material by a plating or deposition process in the first pattern groove;
    a second sensing pattern disposed in the second pattern groove on the second side of the base and including a second conductive material by a plating or deposition process in the second pattern groove;
    a first wire groove formed on the first side of the base by irradiating laser to the first side of the base;
    a second wire groove formed on the second side of the base by irradiating laser to the second side of the base;
    a first wire disposed in the first wire groove in the second area and connecting the first sensing pattern to the integrated circuit, the first wire including a third conductive material by a plating or deposition process in the first wire groove; and
    a second wire disposed in the second wire groove on the second side of the base and connecting the second sensing pattern to the integrated circuit, the second wire including a fourth conductive material by a plating or deposition process in the second pattern groove,
    wherein the first area has a concave curved surface.

2. The touch control device of claim 1,
    wherein the first pattern groove and the first wire groove are connected to each other, and
    the second pattern groove and the second wire groove are connected to each other.

3. The touch control device of claim 1,
    wherein the first sensing pattern and the first wire are formed integrally, and
    the second sensing pattern and the second wire are formed integrally.

4. The touch control device of claim 1,
    wherein the base comprises resin selected from one or more of Polycarbonate (PC), Polyamide (PA), and acrylonitrile-butadiene-styrene copolymer (ABS), and metal oxide selected from one or more of Mg, Cr, Cu, Ba, Fe, Ti, and Al.

5. The touch control device of claim 1,
    wherein the base is formed by being coated on resin, glass, or leather.

6. The touch control device of claim 1,
    wherein the base comprises a first base and a second base laminated in a touch area of the first base.

7. A vehicle including the touch control device of claim 1.

8. The vehicle of claim 7,
    wherein the touch control device is installed in a centralized control system installed in a gearbox.

9. A method for manufacturing a touch control device, the method comprising steps of:
    preparing a base including a metal complex and integrally provided with a first area into which a touch signal is input and a second area in which an integrated circuit is mounted, the first area having a concave curved surface;
    forming a first pattern groove by irradiating laser on the first area on a first side of the base;
    forming a second pattern groove by irradiating laser on a second side of the base;
    forming a first wire groove by irradiating laser on the second area on the first side of the base;
    forming a second wire groove by irradiating laser on the second side of the base;
    forming a first sensing pattern including a first conductive material by a plating or deposition process in the first pattern groove;
    forming a second sensing pattern including a second conductive material by a plating or deposition process in the second pattern groove;
    forming a first wire including a third conductive material by a plating or deposition process in the first wire groove; forming a second wire including a fourth conductive material by a plating or deposition process in the second wire groove; and
    mounting the integrated circuit in the second area to electrically connect to the first wire and the second wire.

10. The method of claim 9,
    wherein irradiating laser on the first side of the base comprises having metal seeds exposed in the first pattern groove, the second pattern groove, the first wire groove, and the second wire groove, and
    wherein the plating or deposition process of the first sensing pattern, the second sensing pattern, the first wire, and the second wire comprises having the first, second, third and fourth conductive materials, respectively, stuck to the metal seeds.

11. The method of claim 9,
    wherein the first pattern groove, the second pattern groove, the first wire groove, and the second wire groove are formed in the same process.

12. The method of claim 9,
    further comprising a step of applying current to the first and second sensing patterns, examining a change in mutual capacitance between the two sensing patterns, and determining whether the patterns fit for sensors based on the examination result.

13. The method of claim 9, further comprising a step of coating the base on resin, glass, or leather.

14. A touch control device comprising:
a single base including a metal complex and integrally provided with a first area into which a touch signal is input and a second area in which an integrated circuit is mounted;
a first pattern groove formed on a first side of the base in the first area;
a second pattern groove formed on a second side, opposing the first side, of the base in the first area;
a first sensing pattern disposed in the first pattern groove on the first side of the base and including a first conductive material;
a second sensing pattern disposed in the second pattern groove on the second side of the base and including a second conductive material;
a first wire groove formed on the first side of the base in the second area;
a second wire groove formed on the second side of the base in the second area;
a first wire disposed in the first wire groove on the first side of the base and connecting the first sensing pattern to the integrated circuit, the first wire including a third conductive material; and
a second wire disposed in the second wire groove on the second side of the base and connecting the second sensing pattern to the integrated circuit, the second wire including a fourth conductive material,
wherein the first area has a concave curved surface.

* * * * *